(12) United States Patent
Meuninck et al.

(10) Patent No.: US 10,581,798 B2
(45) Date of Patent: Mar. 3, 2020

(54) NETWORK BASED DISTRIBUTION FOR COMPUTE RESOURCE AND APPLICATION ACCESSIBILITY

(71) Applicant: AT&T Intellectual Property I, L.P., Atlanta, GA (US)

(72) Inventors: Troy Meuninck, Newnan, GA (US); Matthew Jeanneret, Cartersville, GA (US); Donald Newton, Flowery Branch, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/796,200

(22) Filed: Oct. 27, 2017

(65) Prior Publication Data

US 2019/0132280 A1 May 2, 2019

(51) Int. Cl.
| | |
|---|---|
| *H04W 4/00* | (2018.01) |
| *H04L 29/12* | (2006.01) |
| *H04L 12/66* | (2006.01) |
| *H04L 29/08* | (2006.01) |
| *H04L 12/723* | (2013.01) |
| *H04L 12/751* | (2013.01) |

(52) U.S. Cl.
CPC .......... *H04L 61/1511* (2013.01); *H04L 12/66* (2013.01); *H04L 45/02* (2013.01); *H04L 45/50* (2013.01); *H04L 61/2528* (2013.01); *H04L 69/325* (2013.01)

(58) Field of Classification Search
CPC combination set(s) only.
See application file for complete search history.

(56) References Cited

U.S. PATENT DOCUMENTS

| | | | |
|---|---|---|---|
| 9,350,710 B2 | 5/2016 | Herle et al. | |
| 9,392,023 B2 | 7/2016 | de los Reyes et al. | |
| 9,419,841 B1 | 8/2016 | Kozolchyk et al. | |
| 9,419,992 B2 | 8/2016 | Ricarfort et al. | |
| 9,465,953 B2 | 10/2016 | Sharma et al. | |
| 9,489,647 B2 | 11/2016 | Martinez et al. | |
| 9,571,456 B2 | 2/2017 | Agarwal et al. | |
| 9,660,998 B1 | 5/2017 | Sethi | |
| 9,735,943 B2 | 8/2017 | Kalligudd | |

(Continued)

*Primary Examiner* — Khaled M Kassim
*Assistant Examiner* — Syed Ali
(74) *Attorney, Agent, or Firm* — Hartman & Citrin LLC

(57) ABSTRACT

Concepts and technologies provided herein pertain to network based distribution for compute resource and application accessibility. A processor executing instructions can intercept, at a provider edge that communicatively couples with a private network, a domain name system address record query from a domain name system client. A processor can receive, at the provider edge, a border gateway protocol update message, and determine, from a border gateway protocol server, whether information about a domain name system service record exists within the border gateway protocol update message. In response to determining that the border gateway protocol update message includes information about the domain name system service record, a processor can obtain a provider edge proxy application address from the border gateway protocol server, and provide the provider edge proxy application address to the domain name service client in a response to the domain name system address record query.

15 Claims, 11 Drawing Sheets

(56) References Cited

U.S. PATENT DOCUMENTS

| | | | |
|---|---|---|---|
| 2004/0261116 A1* | 12/2004 | Mckeown | H04L 12/2801 |
| | | | 725/109 |
| 2006/0190570 A1* | 8/2006 | Booth, III | H04L 12/4641 |
| | | | 709/220 |
| 2006/0227758 A1* | 10/2006 | Rana | H04L 45/04 |
| | | | 370/351 |
| 2009/0156213 A1* | 6/2009 | Spinelli | H04W 92/02 |
| | | | 455/436 |
| 2015/0188943 A1* | 7/2015 | Williams | H04L 63/0272 |
| | | | 713/151 |
| 2015/0271557 A1* | 9/2015 | Tabe | H04N 21/4788 |
| | | | 725/14 |
| 2016/0197909 A1 | 7/2016 | Innes | |
| 2016/0226759 A1* | 8/2016 | Zhang | H04L 49/25 |
| 2017/0126664 A1 | 5/2017 | Khandelwal et al. | |
| 2017/0195161 A1* | 7/2017 | Ruel | H04L 12/4633 |
| 2017/0195237 A1* | 7/2017 | Parasmal | H04L 47/2433 |

\* cited by examiner

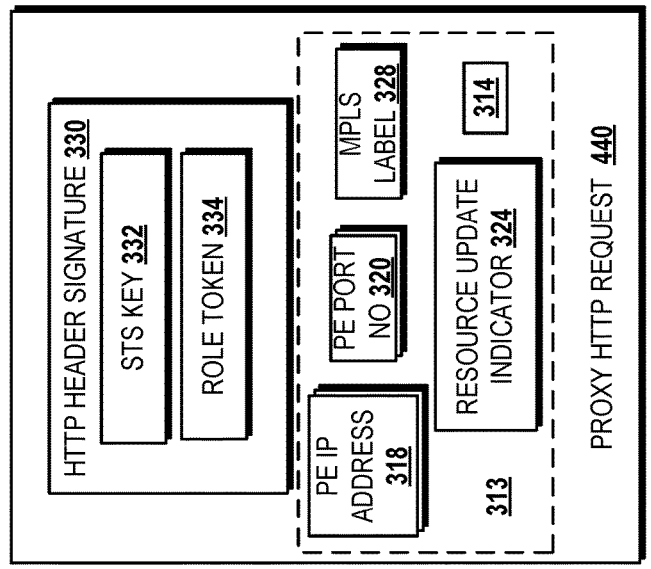
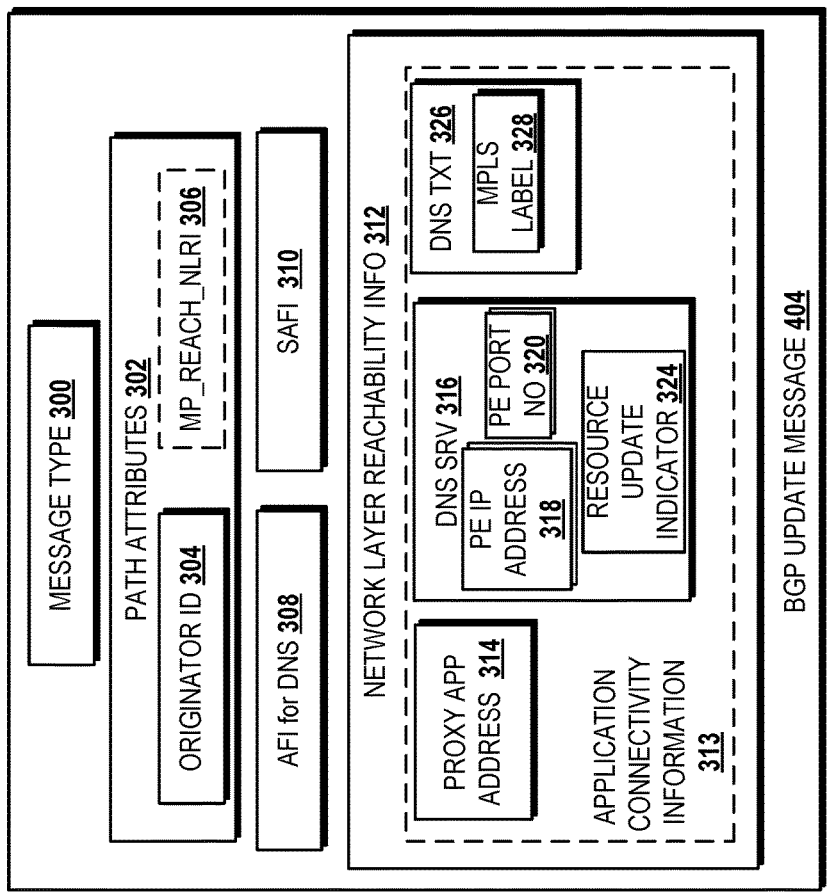
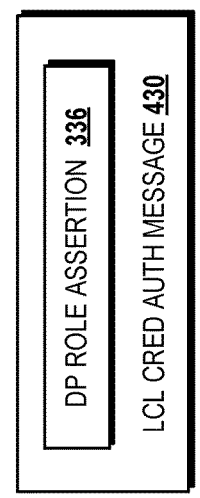

NETWORK BASED DISTRIBUTION FOR COMPUTE RESOURCE AND APPLICATION ACCESSIBILITY

BACKGROUND

In conventional network environments, a single domain name system (DNS) authoritative master server operates as a sole global authority to handle public updates of configurations and reachability addresses for a public domain name space, occasionally referred to as zone changes. Conventionally, a single DNS authoritative master server exists and is typically located within a publicly reachable network domain where the DNS zone changes can be propagated to multiple DNS authoritative slave servers which mirror the information received by the DNS authoritative master server at various network nodes in the publicly reachable network domain. Typically, a DNS cache within a privately reachable network domain may query a DNS authoritative name server slave within the publicly reachable network domain in order to fulfill an external IP address request from a DNS client within the privately reachable network domain. In view of the Open System Interconnection model, typically most information and activity on an application layer (referred to as Layer 7 or L7) is hidden from a network layer (referred to as Layer 3 or L3) on a network. Thus, the network devices and/or modules handling the network layer conventionally do not participate at the application layer due to the application layer obscuring access and visibility of packets.

SUMMARY

Concepts and technologies disclosed herein are directed to virtual private network based distribution for compute resource and application accessibility. According to one aspect of the concepts and technologies disclosed herein, a method is disclosed. The method can include intercepting, at a provider edge that communicatively couples with a private network, a domain name system address record query from a domain name system client. The private network can include a layer three virtual private network that uses multi-protocol label switching. The method can include receiving, at the provider edge, a border gateway protocol update message. The method also can include determining, from a border gateway protocol server of the provider edge, whether information about a domain name system service record exists within the border gateway protocol update message. The border gateway protocol update message can include a provider edge proxy application address. In some instances, the border gateway protocol update message can include an address family identifier and a subsequent address family identifier. The address family identifier can indicate a domain name system, and the subsequent address family identifier can indicate network layer reachability information. In response to determining that the border gateway protocol update message includes information about the domain name system service record, the method can continue with obtaining, by a domain name system server at the provider edge, a provider edge proxy application address from the border gateway protocol server. The method also can include providing, by the domain name system server, the provider edge proxy application address to the domain name service client in a response to the domain name system address record query. Providing the provider edge proxy application address to the domain name system client can direct a client to a provider edge proxy application. In some embodiments, the client can include a Hypertext Transfer Protocol client. The method also can include receiving, from the client, a local credential associated with a user. The method can include determining a data partner role assertion based on the local credential, and obtaining, by the provider edge proxy application executing at the provider edge, a key and a role token based on the data partner role assertion. The method can include requesting, by the provider edge proxy application from the border gateway protocol server, information about the domain name system service record contained in the border gateway protocol update message. The method also can include receiving, from the border gateway protocol server, information about the domain name system service record contained in the border gateway protocol update message, and providing, by the provider edge proxy application, access to a data resource community via the private network. In some instances, providing access to a data resource community can be based on the key, the role token, and the information about the domain name system service record contained in the border gateway protocol update message.

According to another aspect of the concepts and technologies disclosed herein, a system is disclosed. In some instances, the system can be resident at a provider edge and coupled to a private network. The system can include a processor and a memory. The memory stores computer-executable instructions that, in response to being executed by the processor, cause the processor to perform operations. The operations can include intercepting a domain name system address record query from a domain name system client. The operations also can include receiving a border gateway protocol update message via a private network. In some instances, the private network includes a layer three virtual private network that uses multi-protocol label switching. The operations can include determining, from a border gateway protocol server, whether information about a domain name system service record exists within the border gateway protocol update message. The border gateway protocol update message can include a provider edge proxy application address. In some embodiments, the border gateway protocol update message can include an address family identifier and a subsequent address family identifier, where the address family identifier indicates a domain name system, and the subsequent address family identifier indicates network layer reachability information. In response to determining that the border gateway protocol update message includes information about the domain name system service record, the processor can obtain a provider edge proxy application address from the border gateway protocol server. The operations can include providing the provider edge proxy application address to the domain name service client in a response to the domain name system address record query. In some instances, providing the provider edge proxy application address to the domain name system client can direct a client to a provider edge proxy application. In some embodiments, the client can include a Hypertext Transfer Protocol client.

In some instances, the operations include receiving, from the client, a local credential associated with a user. The operations can include determining a data partner role assertion based on the local credential, and obtaining, via the provider edge proxy application, a key and a role token based on the data partner role assertion. The operations further can include requesting, via the provider edge proxy application from the border gateway protocol server, information about the domain name system service record contained in the border gateway protocol update message. In some instances, the processor can perform operations that include receiving, from the border gateway protocol server, information about the domain name system service record contained in the border gateway protocol update message. The operations can include providing, via the provider edge proxy application, access to a data resource community via the private network based on the key, the role token, and the information about the domain name system service record contained in the border gateway protocol update message.

According to yet another aspect, a computer storage medium is disclosed. The computer storage medium can have compute-executable instructions stored thereon. When the computer-executable instructions are executed by a processor, the processor can perform operations including intercepting a domain name system address record query from a domain name system client. The operations also can include receiving a border gateway protocol update message via a private network. The private network can include a layer three virtual private network that uses multi-protocol label switching. The operations can include determining, from a border gateway protocol server, whether information about a domain name system service record exists within the border gateway protocol update message. In some instances, the border gateway protocol update message can include a provider edge proxy application address.

In response to determining that the border gateway protocol update message includes information about the domain name system service record, the operations can include obtaining a provider edge proxy application address from the border gateway protocol server, and providing the provider edge proxy application address to the domain name service client in a response to the domain name system address record query. In some instances, providing the provider edge proxy application address to the domain name system client can direct a client to a provider edge proxy application. In some embodiments, the client can include a Hypertext Transfer Protocol client. The operations also can include receiving, from the client, a local credential associated with a user. The operations also can include determining a data partner role assertion based on the local credential, and obtaining, via the provider edge proxy application, a key and a role token based on the data partner role assertion. The operations can include requesting, via the provider edge proxy application from the border gateway protocol server, information about the domain name system service record contained in the border gateway protocol update message. The operations can include receiving, from the border gateway protocol server, information about the domain name system service record contained in the border gateway protocol update message. In some instances, information in the border gateway protocol update message can include an address family identifier and a subsequent address family identifier, where the address family identifier can indicate a domain name system, and the subsequent address family identifier can indicate network layer reachability information. The operations can include providing, via the provider edge proxy application, access to a data resource community via the private network based on the key, the role token, and the information about the domain name system service record contained in the border gateway protocol update message.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3D illustrate aspects of messages and requests suitable to implement embodiments of the concepts and technologies described herein.

DETAILED DESCRIPTION

Figure 1:
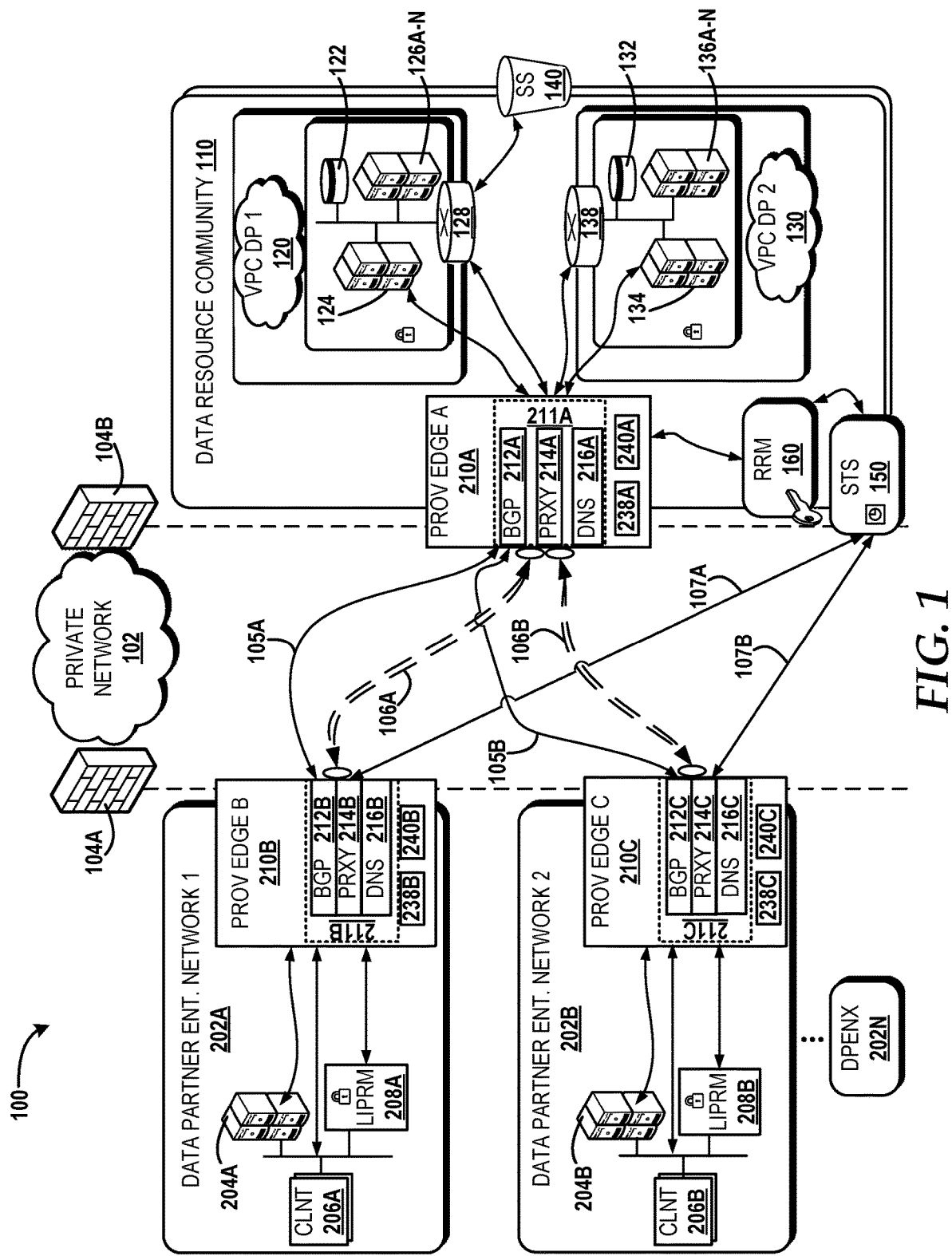
FIG. 1 is a block diagram illustrating aspects of an operating environment suitable to implement concepts for virtual private network based distribution for accessibility of compute resources and applications.

Cloud computing is becoming more prevalent as enterprise network users connect mobile devices and other user equipment to enterprise networks. In cloud computing, hardware and software resources can be supplied to remote computing devices on-demand, thereby generating an increasing amount of data stored and accessed via discretely owned networks. Users associated with an enterprise may connect to a local network to conduct business that involves proprietary or sensitive information that is and/or should be shielded from public view and/or other competing enterprises. Conventionally, enterprise network users connect to an enterprise network, but may have limited access to remote cloud computing services. This limitation of access to cloud services may, in some instances, be further compounded by a private enterprise network not being privy to application layer information associated with the remote cloud computing services.

In some instances, operators of separate enterprise networks may desire for their users to access cloud application processors, community data pools, and other compute resources in order to provide processing capacity, data sharing, and/or collaborative development on joint projects that require the use of shared digital resources in a cloud environment. However, owners of cloud resources (e.g., cloud computing processors, distributed application services, and cloud storage services) may seek to maintain a federated security domain so that access is controlled and data is not improperly released to unauthorized users across the separately owned enterprise networks. On a small scale, individual users conventionally have created individual account subscriptions to access a particular digital cloud resource, such as access to a software as a service subscription, through a public network for their own private use. However, the conventional paradigm of creating individual account subscriptions of each user can be untenable for massively large enterprises (e.g., large corporations which have private enterprise networks to support computing resources for thousands, or even millions of client devices). Additionally, the complexity of network security compliance increases when the massively large enterprises seek to collaborate or share information and computing resources in a cross-owner network environment, such as when two or more enterprise networks seek to share cloud resources owned and/or operated by a third party. Thus, many enterprise network system administrators have been unwilling and/or unable to share or unlock access to cloud computing resources when security domains span multiple compute resource owners.

The following detailed description is directed to network layer based distribution mechanisms for accessibility to privately reachable compute resources and applications within a cloud environment without merging authentication domains in order to maintain federated security policies. Embodiments of the present disclosure can enable a private network to distribute accessibility information and provide individualized access to shared data sources and compute resources in a secure manner without burdening clients within local enterprise networks. Aspects of the present disclosure include multiple enterprise networks that are each operated by separate data partners. Each enterprise network can be communicatively coupled to a data resource community that includes remote cloud resources, such as compute resources and applications remotely located in a private virtual cloud. Thus, each enterprise network that participates in connection to a data resource community may be referred to as a data partner enterprise network. Each of the data partner enterprise networks can have a provider edge with a provider edge application that is in communication with an instance of a provider edge application at the data resource community. Each instance of the provider edge application can connect to the data resource community via a private network, such as a virtual private network that is autonomous and operates using multi-protocol label switching (MPLS). Each data partner enterprise network can maintain an independent, local authentication domain so that local enterprise network users need not supply separate credentials for accessing the data resource community, but rather can provide local credentials to the data partner enterprise network. Instead of a conventional single DNS authoritative master server resident in a public network, aspects of the present disclosure can include two or more DNS authoritative master servers, such as one at each provider edge of the data partner enterprise networks.

When a compute resource and/or application becomes available in a virtual private cloud of the data resource community for shared use and access among the data partner enterprise networks, application connectivity information can be published to inform data partner enterprise networks of such availability. Aspects of the present disclosure can use a border gateway protocol (BGP) server to generate a BGP update that carries information about domain name system records. The BGP update provided to each provider edge can be used to redirect DNS clients within data partner enterprise networks to a provider edge proxy application, which in turn can use information about DNS records in the BGP update to securely establish a network connectivity path through the network layer of the private network that uses MPLS. The provider edge proxy application can be configured to arbitrate authentication and authorization services between the security domains of the data resource community and the data partner enterprise network(s). The provider edge proxy application executing within a data partner enterprise network can obtain MPLS label information from DNS records in the BGP update so as to build a secure, traffic-engineered tunnel for connectivity to the data resource community via traversal of the network layer of the virtual private network. By this, network traffic can be engineered based on application layer information from DNS records contained in the BGP update(s), thereby ensuring that federated security to remote applications and resources is maintained, while also improving network performance through consolidation of network traffic. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor based or programmable consumer electronics, distributed computing systems, minicomputers, mainframe computers, switches, and other particularized, non-generic machines.

Referring now to FIG. 1, aspects of an operating environment 100 for providing network based distribution for compute resource and application accessibility will be described, according to an illustrative embodiment. The operating environment 100 shown in FIG. 1 includes a private network 102 that can be protected by a firewall in a security domain, such as one of the firewalls 104A, 104B. According to various embodiments, the private network 102 can provide one or more data partner enterprise networks with access to a data resource community, such as the data partner enterprise network 1 (DPEN1) 202A and data partner enterprise network 2 (DPEN2) 202B in communication with the data resource community 110. The private network 102 can be configured as a Layer 3 virtual private network that operates using MPLS to establish secure tunnels for communication, such as the secure tunnels 106A, 106B. In some embodiments, the private network 102 may be referred to as a virtual private routed network (VPRN) when operating at Layer 3 using MPLS. As a VPRN, the private network 102 can utilize MPLS and Layer 3 virtual routing and forwarding (VRF) so as to segment routing tables for each data partner enterprise network using the resources of the data resource community 110. Aspects of the present disclosure utilize the private network 102 to communicate application connectivity information and/or network layer reachability information in DNS records through BGP updates. In some aspects, the private network 102 can send BGP messages, such as BGP updates, using Multiprotocol BGP (MP-BGP). The private network 102 also can be configured as an autonomous virtual private network so as to facilitate the use of MP-BGP and BGP updates. In some embodiments, BGP updates can be sent to the DPEN1 202A and the DPEN2 202B using a communication link over the private network 102, such as the communication links 105A and 105B, respectively. The private network 102 also can provide separate communication links to allow for authentication and access to the data resource community 110, such as the communication links 107A and 107B that communicatively couple the DPEN1 202A and the DPEN2 202B to the data resource community 110, respectively. In some embodiments, the private network 102 may be available for use by data partner enterprise networks, such as the DPEN1 202A and the DPEN2 202B, via a subscription service. The subscription service may be included with other communication services or as an isolated network service.

The private network 102 can include various devices, for example, servers, computers, switches, routers, and/or other network nodes in communication with one another, as is generally known to one of ordinary skill in the art. The functionality of the private network 102 (i.e., functionality of a Layer 3 virtual private network that supports MPLS) is generally known and therefore will not be described herein in detail. The illustrated private network 102 is shown in communication with two instances of a data partner enterprise network (i.e., the DPEN1 202A and the DPEN2 202B) and one instance of a data resource community (i.e., the data resource community 110), though it should be appreciated that this may not necessarily be the case in all embodiments. In some embodiments, zero, one, or more than two instances of a data partner enterprise network, such as the data partner enterprise network X (DPENX) 202N, may be communicatively coupled to the private network 102. Similarly, zero or more than one instance of the data resource community 110 may communicate with a data partner enterprise network, such as one of the DPEN1 202A and/or the DPEN2 202B, via the private network 102. It is understood that the examples are for illustration purposes only and should not be construed as limiting in any way.

The data resource community 110 can include remote cloud services, applications, processors, data stores, or other digital compute resources that can communicatively couple to the private network 102. The data resource community 110 can be operated by one or more remote cloud administrators of compute resources and applications that can be executing on virtual and/or physical devices. In some embodiments, the data resource community 110 can provide a Software as a Service (SaaS), a Platform as a Service (PaaS), an Infrastructure as a Service (IaaS), or any combination thereof. SaaS is defined herein as the capability provided to the user to use the provider's application operating on a cloud infrastructure, such as the data resource community 110. The user does not manage or control the underlying cloud infrastructure including networks, servers, operating systems, storage, or individual application capabilities, with the possible exception of user-specific application configuration settings. PaaS is defined herein as the capability provided to the user to deploy onto a cloud infrastructure, such as the data resource community 110, user-created or acquired applications or content created using programming languages, libraries, services, and/or tools supported by the provider. The user does not manage or control the underlying cloud infrastructure including networks, servers, operating systems, and storage, but may have or obtain control over the deployed applications and possibly configuration settings for the application-hosting environment. IaaS is defined herein as the capability provided to the user to provision processing, storage, networks, and other computing resources where the user is able to deploy and run arbitrary software, which can include operating systems and applications. Examples of providers that can operate within the data resource community 110 can include, but are not be limited to, Amazon Web Services by AMAZON (dot) COM INCORPORATED, the AZURE platform from MICROSOFT CORPORATION, the GOOGLE CLOUD PLATFORM from ALPHABET INC, the ORACLE CLOUD from the ORACLE CORPORATION, other providers of digital resources in a cloud environment, and the like.

The data resource community 110 can include one or more virtual private cloud (VPC) that is a specific collection of remote cloud services. For example, the data resource community 110 can include a virtual private cloud data partner 1 (VPCDP1) 120 and the virtual private cloud data partner 2 (VPCDP2) 130. In some embodiments, a VPC, such as a VPCDP1 120 and/or the VPCDP2 130, can enable an enterprise network user to launch and utilize resources in a virtual network that is both private and customized according to the specific attributes associated with a subscription, account, and/or roles for the VPC. The data resource community 110 can include a role and resource mapping (RRM) module, such as the RRM 160, that manages subscriptions, accounts, and roles associated with access to each VPC. The RRM 160 can allow users access to different VPC's based on a role token that is received from a data partner enterprise network, which will be discussed in detail below. For example, a role may correspond with access credentials for an engineer, a team manager, a project lead, an administrator, or the like. Thus, access to a particular VPC and/or digital resources within a VPC, may be granted or denied based on the amount of network access privileges associated with each role and role token.

Each VPC may be accessible within the data resource community 110 via a virtual private gateway (VPG), such as the VPG 128 and the VPG 138 for the VPCDP1 120 and the VPCDP2 130, respectively. Each VPC may have its own VPG such that communication traffic to and/or from the VPC can flow based on addresses assigned to digital resources within the VPC. Because each VPC can be a specific set of digital resources, the amount and type of digital resources within each VPC can vary, dependent on the parameters, permissions, and specifications assigned to the VPC. For example, the DPEN1 202A may seek to participate in a joint research project with DPEN2 202B. Certain digital resources may be assigned to roles (e.g., via a role token), where the role token activates specific permissions to use the VPC. Each VPC can include a data lake, such as the data lake 122 and the data lake 132, that can store data and files for users of the data resource community 110 based on the role token that is provided to the RRM 160 and relayed to the VPC.

Each VPC can include a different set of resources for use in the cloud, such as different remote applications that each operate as a separate SaaS. For example, the VPCDP1 120 can include a collection of cloud applications 126A-N, where each cloud application operates as a separate SaaS and "N" represents the total amount of cloud applications within the VPCDP1 120. Thus, in some embodiments, access to cloud applications may be dependent on the role token (and thus associated role) that is provided to use resources within the VPC. For example, a user who is an engineer may be associated with a role and role token that allows for access to cloud applications 126A-C, while a user who is a network administrator may be associated with a role and role token allows for access to the entire collection of cloud applications 126A-N. Similarly, the VPCDP2 130 can also have a collection of cloud processors, such as the collection of cloud processors 136A-N, where each cloud processor can operate as a separate remote processor and "N" represents the total amount of cloud processors within the VPCDP2 130. In some embodiments, a VPC can be communicatively coupled to a private cloud storage system, such as the private cloud storage system 140 (hereinafter SS 140). The SS 140 can be accessed via the VPG 128, but may not necessarily reside within the VPCDP1 120. The SS 140 can provide dynamically scalable remote storage services for shared data among the data partners, such as the DPEN1 202A and the DPEN2 202B. An example provider of the SS 140 can include AMAZON SIMPLE STORAGE SERVICE (S3) from AMAZON (dot) COM INCORPORATED. It is understood that the examples of resources for a VPC discussed above (e.g., represented as a collection of cloud applications, the cloud processors, and the private cloud SS) are for illustration purposes only, and therefore should not be construed as limiting in any way.

In some embodiments, the internet protocol (IP) address of the resource(s) within a VPC (e.g., the data lake 122, the data lake 132, the collection of cloud applications 126A-N, the collection of cloud processors 136A-N, and/or the SS 140) may change (a) periodically. Thus, a VPC can include a VPC DNS recursor, such as the VPC DNS recursor 124 for VPCDP1 120 and the VPC DNS recursor 134 for the VPCDP2 130, that can receive and query for DNS zone changes within the VPC, such as by determining an IP address for a unique private resource uniform resource identifier (URI) that is associated with access to one or more of the resources within and/or accessible via the VPC, such as the VPCDP1 120. In some instances, a VPC DNS recursor can provide the unique private resource URI to the PE of the data resource community 110 (e.g., the proxy application 214A of the PE A 210A). Because the IP address associated with the unique private resource URI may change a VPC DNS recursor, such as the VPC DNS recursor 124, may not release or broadcast the IP address associated with the unique private resource URI for the particular resource of the data resource community 110 to data partner enterprise networks (e.g., DPEN1 202A and DPEN2 202B) in order to maintain a federated security policy. Instead, the provider edge (e.g., PE A 210A) of the data resource community 110 can advertise or otherwise provide a BGP update message informing the data partner enterprise networks (via the private network 102 connected to their respective provider edge) of application connectivity information associated with the available digital resource of the data resource community 110. By not advertising the actual IP address of the desired resource, the data resource community 110 can provide and maintain secure access to compute and application resources based on the use of BGP update messages that include community application connectivity information across a layer three virtual private network that uses MPLS, thereby enabling the network layer to carry application layer information, which in turn can reduce network congestion and provide an efficient computing environment. For example, the SS 140 may become available for use by one or more of the data partner enterprise networks (e.g., the DPEN1 202A and the DPEN2 202B), and this availability can be advertised to data partner enterprise networks using BGP update message(s) while maintaining a federated security policy by only permitting access through a provider edge (PE) proxy application, as further discussed in detail below. Aspects of the present disclosure allow a provider edge (PE) of a data resource community to receive a notification (via a BGP update message) that a DNS resource record associated with the SS 140 has been updated and is available for use by one or more of the data partner enterprise networks. It is understood that the examples discussed herein are for illustration purposes only, and therefore should not be construed as limiting in any way.

A provider edge (PE) of the data resource community 110, such as the PE A 210A, can reside at the edge of a private network so as to communicatively couple one network to another, such as the data resource community 110 to the private network 102 and the respective data partner enterprise networks 202A, 202B. A PE (e.g., any of the PE A 210A of the data resource community 110, the PE B 210B of the DPEN1 202A, and the PE C 210C of the DPEN2 202B) can include a computing system that is configured to handle a variety of routing protocols that are used to traverse the private network 102. A PE can include a processor (e.g., the processor 238A, the processor 238B, and the processor 238C) and a memory (e.g., the memory 240A, the memory 230B, the memory 240C). For example, the routing protocols can include, but are not limited to, Border Gateway Protocol (which is used herein to include multiprotocol extensions of BGP such as MP-BGP), Open Shortest Path First (OPSF), Multiprotocol Label Switching (MPLS), and other protocols designated by a network provider for the private network 102. A conventional VPN is typically created by configuring a full mesh of tunnels or permanent virtual circuits to all sites in the VPN. As such, the conventional VPN may not be easy to maintain or expand because adding additional sites to the VPN typically requires changing each edge device in the VPN. Aspects of the present disclosure provide a provider edge that allows the number of data partner enterprise networks to be added or subtracted dynamically and for one or more data resource communities (e.g., the data resource community 110) to be added or subtracted from connection to the private network 102 without the need to reconfigure each PE (e.g., any of the PE A 210A, the PE B 210B, and the PE C 210C) coupled to the private network 102.

Each PE (e.g., the PE A 210A, the PE B 210B, and the PE C 210C) that couples to the private network 102 may be substantially similar to each other. For example, each PE can include a BGP server, a PE proxy application, and a DNS server. In some embodiments, each PE can store a PE application that can oversee, manage, or otherwise facilitate operations provided by the BGP server, the PE proxy application, the DNS server, and/or any other operations that occur at a provider edge (e.g., the PE application 211B of the PE B 210B and the PE application 211C of the PE C 210C). Each PE application (e.g., the PE applications 211B, 211C) can be substantially similar so as to manage and facilitate connections to a data resource community via the private network 102. In some embodiments, the PE A 210A also can include a PE application, such as the PE application 211A). Continuing with discussion of FIG. 1, the PE A 210A can include the BGP server 212A, the PE proxy application 214A, and the DNS server 216A. The PE proxy application 214A can be configured to manage access to the VPC's (e.g., the VPCDP1 120 and the VPCDP2 130) for the data resource community 110. The PE B 210B can include the BGP server 212B, the PE proxy application 214B, and the DNS server 216B. The PE C 210C can include the BGP server 212C, the PE proxy application 214C, and the DNS server 216C. Each PE proxy application (e.g., the PE proxy applications 214A, 214B, and 214C) can be configured to have the same application address, referred to as a proxy application address (e.g., the PE proxy application address 214W of the PE proxy application 214B illustrated in FIG. 2). For example, each of the PE proxy applications 214A, 214B, and 214C can have the same PE proxy application address of "20.20.20.1" and may conform to an internet protocol version 4 (IPv4) address format or version 6 (IPV6) address format. Each of the PE proxy applications 214A, 214B, and 214C can communicate with each other by establishing secure tunnels, such as the secure tunnels 106A, 106B. In some embodiments, each provider edge (e.g., the PE A 210A, the PE B 210B, and the PE C 210C) can have an IP address (e.g., PE B IP address 210W being assigned to virtual and/or physical hardware of the PE B 210B) and each IP address may be different than the other.

To advertise availability of digital resources and applications within the data resource community 110 that can be used by clients of a data partner enterprise network, the PE A 210A can provide BGP communications, such as BGP update messages, to the BGP servers residing at the PEs of the data partner enterprise networks, such as the BGP servers 212B, 212C residing at the PE B 210B of the DPEN1 202A and the PE C 210C of the DPEN2 202B, respectively. The BGP communications that are sent to each PE (e.g., any of the PE A 210A, the PE B 210B, and the PE C 210C) occur within the IP domain of the private network 102 such that the private network 102 is configured as an autonomous system that provides interior BGP (iBGP) communications. It is understood that BGP communications include communications that use MP-BGP. For example, BGP update messages can include extensions for MP-BGP, such as an address family identifier and a subsequent address family identifier. Each BGP server, such as the BGP servers 212A, 212B, 212C, can communicate across the private network 102 using a communication link, such as the communication links 105A, 105B. As discussed in further detail with respect to FIGS. 3A-3D, the BGP communications, such as a BGP update message, can include application connectivity information. The application connectivity information can include information about a DNS service record, a DNS text record, MPLS labels to reach a proxy application address, and other information that updates a PE with application connectivity and availability information by using references to a domain name system and a PE proxy application residing within a provider edge coupled to the private network 102.

The data resource community 110 also can include a station-to-station (STS) access module, such as the STS 150. The STS 150 can be configured to create and provide trusted users with time-controlled security credentials. Trusted users can include enterprise network users that access the STS 150 through a PE proxy application. For example, the STS 150 can be accessed via an application programming interface (API) call from one or more of the PE proxy applications of the data enterprise networks (e.g., the PE proxy application 214B and/or the PE proxy application 214C). Communications between a PE proxy application of a data partner enterprise network (e.g., PE proxy application 214B of the DPEN1 202A and/or the PE proxy application 214C of the DPEN2 202B) and the STS 150 can occur via a communication link, such as the communication links 107A, 107B. A PE proxy application from a data partner enterprise network can assign a data partner role to an enterprise network user based on the local credentials that the enterprise network user provided to the data partner enterprise network. In turn, the data partner role can be included in an API call to the STS 150 to provide authentication. By this, the STS 150 can authenticate whether enterprise network users should be granted security credentials without creating new accounts, identities, and/or subscriptions for the enterprise network users, thereby avoiding the need for users to sign in with separate login credentials (i.e., negating a requirement that each enterprise network user create their own user name and password specifically for the data resource community 110). In some embodiments, an API call to the STS 150 can conform to an industry standard language, such as a Security Assertion Markup Language (SAML) and extensions thereof (i.e., various versions of SAML, such as SAML version 2.0).

The STS 150 can be communicatively coupled to the RRM 160 such that the STS 150 can verify and/or obtain security credentials so that the PE proxy application of the data partner enterprise network can later access the data resource community 110. For example, the RRM 160 can provide the STS 150 with a role token based on a mapping of the data partner role provided to the STS 150 from the PE proxy application of the data partner enterprise network. Thus, in some embodiments, the security credentials provided by the STS 150 can include a STS key, where the STS key can provide temporary access to the data resource community 110, and a role token, where the role token can authorize access to certain VPC's and/or specific resources within the VPC's. As such, the STS 150 can enable a single sign-on approach for enterprise network users within a data partner enterprise network by providing PE proxy applications the ability to access specific compute and application resources within the data resource community 110 in a secure manner. Further discussion of aspects related to access to the data resource community 110 is provided below with respect to FIG. 2. Further discussion of the operations(s) between the STS 150 and the RRM 160 will be provided with respect to FIGS. 4A and 4B. In some embodiments, the RRM 160 and the STS 150 can reside in the same or different physical or virtual location within the data resource community 110 and can execute via a processor of a computing system of the data resource community 110. It is understood that the examples provided are for illustration purposes only, and therefore should not be construed as limiting in any way.

Each data partner enterprise network, such as the DPEN1 202A and the DPEN 202B, includes a PE (e.g., the PE B 210B and the PE C 210C). As set forth above, each PE can be substantially similar in that each PE can include a BGP server (e.g., the BGP server 212B of the PE B 210B and the BGP server 212C of the PE C 210C), a PE proxy application (e.g., the PE proxy application 214B of the PE B 210B and the PE proxy application 214C of the PE C 210C), and a DNS server (e.g., the DNS server 216B of the PE B 210B and the DNS server 216C of the PE C 210C). It is understood that each data partner enterprise network may implement a variety of physical and/or virtual computing devices, such as switches, routers, data stores, and/or processors to execute and facilitate communication between the PE of the data partner enterprise network and the PE of the data resource community 110. Further discussion of an instance of a PE for a data partner enterprise network will be discussed with respect to FIG. 2. As illustrated, the DPEN1 202A can include a computer system 204A, a client 206A, and a Local Identity Provider and Role Mapping service (LIPRM) 208A. The computer system 204A can host an enterprise portal that allows enterprise network users to engage the client 206A and the PE B 210B for access to the data resource community 110. The computer system 204A can include a physical and/or virtual computing system that is connected to the DPEN1 202A. The DPEN1 202A can include a cellular network, a packet data network, a circuit switched network, or any combination thereof. The DPEN1 202A can be configured for use by a corporation or business. In some embodiments, the DPEN1 202A can access a public network, such as the internet, via the PE B 210B. The client 206A can include a DNS client module (e.g., the DNS client module 205) and/or a Hypertext Transfer Protocol (HTTP) client module (e.g., the HTTP client module 207). The DNS client module 205 can include executable instructions that facilitate interactions between a DNS server (e.g., the DNS server 216B) and a user device (e.g., the user device 225) for an enterprise network user according to DNS protocols. The HTTP client module 207 can include executable instructions that facilitate interactions between a user device and a PE proxy application (e.g., the PE proxy application 214B) according to HTTP protocols. It is understood that HTTP protocols can include extensions and variants, such as HTTP Secure HTTPS. When the client 206A utilizes the DNS client module 205, the client 206A can be referred to and/or operate as a "DNS client." Similarly, when the client 206A utilizes the HTTP client module 207, the client 206A can be referred to and/or operate as an "HTTP(S) client." Although the client 206A is illustrated as having one instance, it is understood that, in some embodiments, a provider edge can have more than one client, such as separate client instances executing to operate using DNS, HTTP, or other protocols or standards. It is understood that types of client modules discussed above (e.g., DNS & HTTP) are provided for illustration purposes only and other clients may be implemented (e.g., an SQL client). Therefore, the embodiments discussed herein should not be construed as limiting the scope of the disclosure in any way. Further discussion of an embodiment of the DPEN1 202A is provided below with respect to FIG. 2.

The operating environment 100 illustrates the DPEN2 202B being substantially similar to the DPEN1 202A, however this may not necessarily be the case. It is understood that different amounts of computing devices may connect to the DPEN2 202B compared the DPEN1 202A. For example, the DPEN1 202A could belong to a large technology corporation while the DPEN2 202B could belong to a private university with a strong engineering program. Other examples include, but are not limited to, competing communication service providers, financial corporations, scientific research institutions, technology companies, or the like. It should be understood that the examples provided are for illustration purposes only, and therefore should not be construed as limiting in any way. As such, the size and scale of each data partner enterprise network can vary based on the needs of the particular enterprise and the enterprise network users. As illustrated, the DPEN2 202B includes an instance of a PE (e.g., the PE C 210C) so as to connect the DPEN2 202B to the private network 102. The DPEN2 202B also can include a computer system 204B, a client 206B, and a LIPRM 208B. An instance of a PE (e.g., the PE C 210C) can reside at the edge of the DPEN2 202B so as to connect an enterprise network user to the data resource community 110 via the private network 102 based on establishment of a secure tunnel (e.g., the secure tunnel 106B), aspects of which will be discussed below with respect to FIG. 2.

Figure 2:
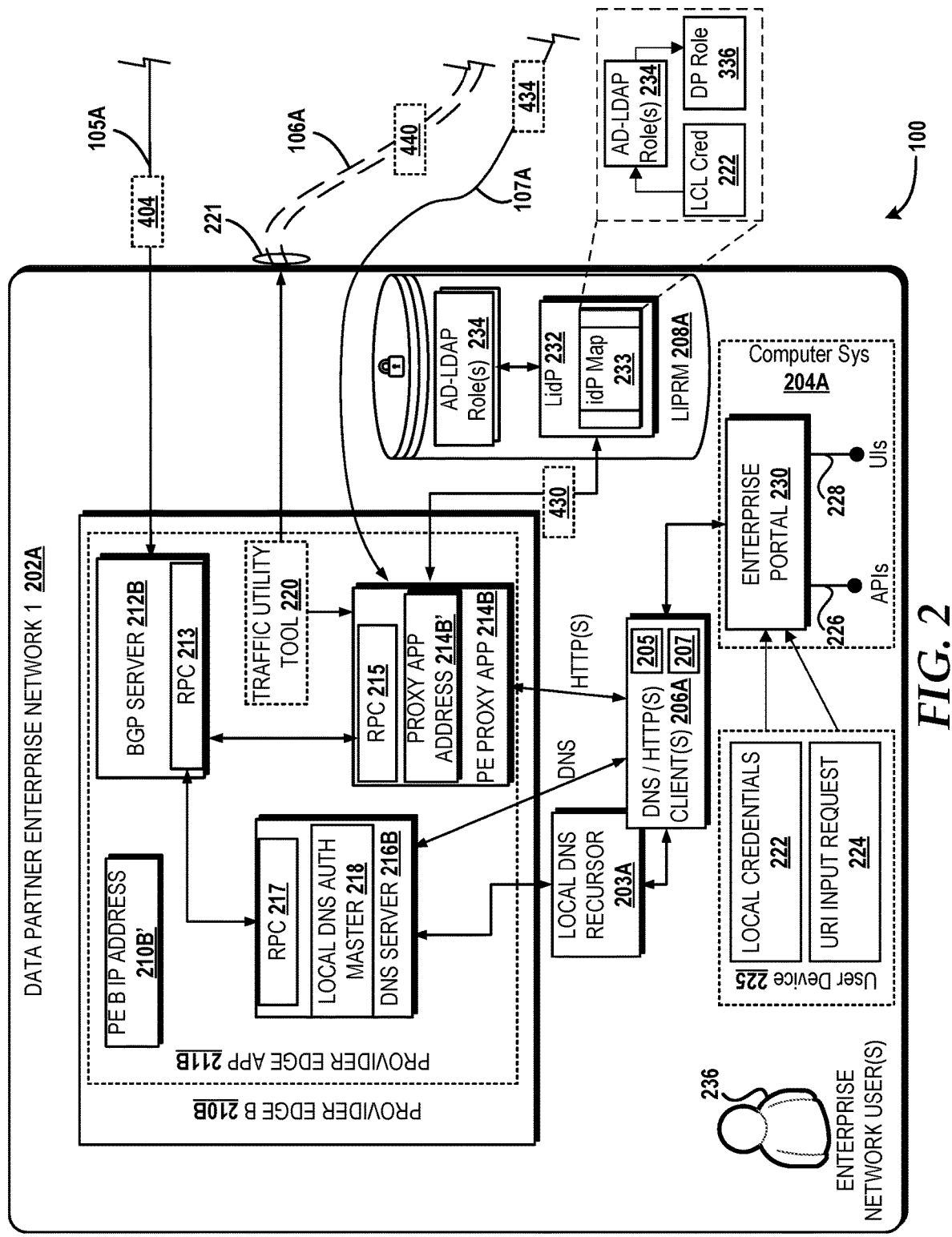
FIG. 2 is a block diagram illustrating aspects of a data partner enterprise network within an operating environment of the present disclosure.

Turning now to FIG. 2 with continued reference to FIG. 1, a block diagram illustrating aspects of a data partner enterprise network within the operating environment 100 will be discussed. Specifically, FIG. 2 illustrates an embodiment of the DPEN1 202A. As illustrated, the DPEN2 202A includes an enterprise network user 236. The enterprise network user 236 can utilize a user device 225 to access information and content within the DPEN1 202A and/or resources outside of the DPEN1 202A, such as resources within the data resource community 110. For example, the enterprise network user 236 of the DPEN1 202A may participate in a joint development project with another technology company who happens to be operate the DPEN2 202B. To participate in the joint development project, the enterprise network user 236 may desire to access the resources and applications within the data resource community 110, even though the enterprise network user 236 does not personally hold an account or subscription to the resources within the data resource community 110. Moreover, because the enterprise network user 236 has a nomadic work schedule, the access point with which the enterprise network user 236 connects to the DPEN1 202A may vary. Aspects of the present disclosure allow the enterprise network user 236 to access and participate in the use of resources within the data resource community 110 despite the remote location and lack of subscription to the data resource community 110. The enterprise network user 236 can input local credentials 222 into an enterprise portal 230. In some embodiments, when the enterprise network user 236 enters a specific uniform resource identifier (URI) (e.g., a URI corresponding to a cloud service company) into the user device 225 while the user device 225 is connected to a public network (e.g., the internet), the enterprise network user 236 may be directed to the public facing home page of the company that runs the cloud service. However, aspects of the present disclosure enable the enterprise network user 236 to connect to an enterprise portal, such as the enterprise portal 230, such that when the same specific URI is entered by the enterprise network user 236, they are directed to the data resource community 110 (which may include resources from the cloud service company) instead of the public facing home page of the company that runs the cloud service.

For example, the computer system 204A can host an enterprise portal, such as the enterprise portal 230, that provides a user interface 228, to the user device 225 of the enterprise network user 236. The enterprise network user 236 can input the local credentials 222 (e.g., their username and password for accessing the DPEN1 202A) to initiate connection with the private network 102. At some time after the enterprise network user 236 has their user device 225 connected to the private network 102 via the enterprise portal 230, the enterprise network user 236 can input a URI that—if connected to the public network would otherwise trigger a conventional DNS recursive process from a DNS authoritative name server slave—generates a URI input request 224 that can be sent through the enterprise portal 230, via an API 226, to a client, such as the client 206A. The client 206A can be configured to support DNS protocols and HTTP protocols. Thus, in some embodiments, the client 206A may be a DNS client and a HTTP client. The client 206A can include computer-executable instructions, when executed by one or more processors, can cause operations to occur that allow for the enterprise network user 236 to receive access to the data resource community 110 despite the data resource community 110 having resources that are dynamic, changing, and otherwise unknown to public DNS recursion queries due to the cloud resources being behind a firewall (e.g., the firewall 104B) of the data resource community 110.

The client 206A can communicate with the DNS server 216B, a local DNS recursor 203A, and the PE proxy application 214B. When the URI input request 224 is received by the client 206A, the client 206A can generate a DNS address query to the local DNS recursor 203A based on the URI from the URI input request 224. Instead of relying solely on a DNS authoritative slave name server to respond to the DNS address query, the local DNS recursor 203A can check whether routing to the URI contained in the DNS address query can be fulfilled by a local DNS authoritative name server master module 218 of the DNS server 216B resident at the PE B 210B. In some embodiments, the local DNS recursor 203A can intercept a DNS address query for inspection and forwarding to the DNS server 216B. The local DNS recursor 203A can include a DNS cache. In some embodiments, the DNS server 216B can include the local DNS authoritative name server master module 218 such that the DNS server 216B can operate as a master authoritative name server within the DPEN1 202A. In some instances, the DNS server 216B can be implemented as an instance of executable computing instructions that is part of the PE application 211B of the PE B 210B. The PE application 211B can be stored in memory and execute on a processor of the PE B 210B. In some embodiments, the PE application 211B also can include the PE proxy application 214B, the BGP server 212B, and a traffic utility tool, such as the traffic utility tool 220. The PE application residing in other data partner enterprise networks (e.g., the PE application 211C of the PE C 210C) and/or data resource communities (e.g., the PE application 211A of the PE A 210A) can operate in a substantially similar manner to the operations discussed above with respect to the PE application 211B. It is understood that the examples provided are for illustration purposes only, and should not be construed as limiting in any way.

The DNS server 216B can communicate with the BGP server 212B in order to check whether a BGP update has been received and is associated with the DNS address query from the client 206A. For example, the BGP server 212B can receive the BGP update message 404 via the communication link 105A from the BGP server 212A of the PE A 210A. The DNS server 216B can communicate with the BGP server 212B via a remote procedure call (RPC) interface 217 of the DNS server 216B and an RPC interface 213 of the BGP server 212B. In some embodiments, the RPC interface 217 and/or the RPC interface 213 can use an open source universal RPC framework, such as gRPC. If the BGP server 212B received a BGP update message, such as the BGP update message 404, that contains application connectivity information, such as information and/or updates about a DNS resource record (e.g., a DNS service record and/or a DNS text record), then the client 206A may be redirected to engage the PE proxy application 214B. In some embodiments, the PE application 211B can direct a DNS client module of the client 206A to use an HTTP client module of the client 206A based on a proxy application address contained in the BGP update message 404. The proxy application address contained in the BGP update message (e.g., the PE proxy application address 314 in the BGP update message 404 shown in FIG. 3A) can be the same as the PE proxy application address 214W associated with the PE proxy application 214B of the PE B 202A.

The PE proxy application 214B can communicate with the BGP server 212B via an RPC interface 215 so as to make requests and receive responses from the RPC interface 213 of the BGP server 212B. The PE proxy application 214B can receive information contained in the BGP update message (s), such as the BGP update message 404, from the BGP server 212B. The PE proxy application 214B can also communicate with a memory of the LIPRM 208A. The LIPRM 208A can store and execute a local identity provider (LidP) access module 232 (hereinafter LidP 232). The LidP 232 can include an identity provider (idP) map 233 (hereinafter idP map 233) that can be used by the LidP 232 to map the local credentials 222 from the enterprise network user 236 to a data partner role that is assigned to the enterprise network user 236 based on the authorization given to an enterprise user profile for the enterprise network user 236. For example, the LidP 232 can identify an enterprise user profile associated with the enterprise network user 236 based on the local credentials 222 given to the enterprise portal 230. The LidP 232 can send a request to an active directory (AD) of the LIPRM 208A for a lightweight directory access protocol (LDAP) role associated with the local credentials 222. The active directory of the LIPRM 208 can return an active directory lightweight directory access protocol role (AD-LDAP role) 234 based on the local credentials 222 provided by the enterprise network user 236. The idP map 233 may have a list of data partner roles that are also known to the RRM 160 and/or the STS 150 of the data resource community 110. The data partner roles are associated with access credentials and specifications that allow for use of particular resources associated with a VPC, such as one or more SaaS applications 126A-N of the VPCDP1 120 being authorized for use based on specific access credentials that are given to certain data partner roles known to the RRM 160 and/or STS 150. The LidP 232 can use the idP map 233 to determine which data partner role should be assigned to the enterprise network user 236 based on the AD-LDAP role 234, which in turn was determined based on the local credentials 222.

In the illustrated embodiment, a data partner role assertion 336 can reflect the data partner role that was determined to be an accurate reflection of the access and authorization that should be granted to the enterprise network user 236 based on the access and authorization that is granted to the enterprise network user 236 within the DPEN1 202A via the local credentials 222. The LIPRM 208A can return a local credential authentication message 430, to the PE proxy application 214B. The local credential authentication message 430 can include the data partner role assertion 336, such as shown in FIG. 3B. In some embodiments, the data partner role assertion 336 can include instructions that conform to SAML, such as an SAML assertion.

The PE proxy application 214B can extract the data partner role assertion 336 from the local credential authentication message 430 so that the data partner role assertion 336 can be included in an authentication request to the STS 150 in order to obtain security credentials and a role token from the data resource community 110, which in turn will be used to gain access to the data resource community 110. For example, the PE proxy application 214B can make an API call to the STS 150 via the communication link 107A in order to send an authentication request for security credentials that are based on the data partner role assertion 336 provided by the PE proxy application 214B. The authentication request sent by the PE proxy application 214B, to the STS 150, can include the data partner role assertion 336 and the PE proxy application address 214W which can inform the STS 150 that the request is coming from an authorized PE proxy application, such as the PE proxy application 214B. The STS 150 can send the data partner role assertion 336 to the RRM 160, which in turn can map the data partner role assertion 336 to a role token that corresponds with a specific level of access for resources within the data resource community 110. The RRM 160 can send an instance of the role token to the STS 150, which in turn can prepare and send an authentication response 434 back to the PE proxy application 214B. The authentication response 434 can include an STS key and a role token, such as the STS key 332 and the role token 334 as seen in the authentication response 434 illustrated in FIG. 3C.

The PE proxy application 214B can use information from the BGP update message(s) (e.g., the BGP update message 404 received by the BGP server 212B) as well the authentication message(s) (e.g., the local credential authentication message 430) to prepare a proxy HTTP request, such as the proxy HTTP request 440. In some embodiments, the PE proxy application 214B can instruct a traffic utility tool, such as the traffic utility tool 220, to establish a secure tunnel with the PE proxy application 214A of the PE A 210A at the data resource community 110. The traffic utility tool 220 can provide control and monitoring of various communication parameters of the DPEN1 202A when communicating with the private network 102. For example, the traffic utility tool 220 can establish the secure tunnel 106A by using a communication interface 221 of the DPEN1 202A and initiating routing based on information contained in the BGP update message. In some embodiments, the STS key 332 provided by the STS 150 can have a time-to-live value and credentials that allow the PE proxy application 214B to access the data resource community 110 through the PE proxy application 214A while maintaining a secure tunnel for a designated amount of time based on the time-to-live value.

Turning now to FIGS. 3A-3D with continued reference to FIGS. 1 and 2, various aspects of messages and requests suitable to facilitate access to the data resource community 110 are disclosed according to an embodiment. FIG. 3A illustrates the BGP update message 404 according to an embodiment of the present disclosure. The BGP update message 404 can be a MP-BGP update message that is sent on a L3 network layer of the private network 102 to a BGP server at a provider edge (e.g., the BGP server 212B and the BGP server 212C). The BGP update message 404 can include a message type 300 so as to inform the BGP server what type of BGP message is being received by the BGP server. For example, the message type 300 can be a numerical value, such as the value "2," indicating that the current BGP communication should be treated as a BGP update message. The BGP update message 404 can have a path attributes category 302 that includes an originator identifier (ID) 304. The originator ID 304 can include the IP address associated with the PE from which the BGP update message 404 was sent. For example, as illustrated in FIG. 1, the BGP server 212A of the PE A 210A may send the BGP update message 404 to the BGP server 212B of the PE B 210B via communication link 105A and also to the BGP server 212B of the PE C 210C via the communication link 105B. If the PE A 210A (where the BGP server 212A resides) has an IP address of 10.0.0.1, then the originator ID 304 could reflect the IP address of 10.0.0.1. In some embodiments, the BGP update message 404 can be addressed to each of the data partner enterprise networks, such as via each data partner enterprise network's IP address. For example, the DPEN1 202A can have an IP address illustrated as a PE B IP address 210W (e.g., 10.0.0.2) and the DPEN2 202B can have a different IP address (e.g., 10.0.0.3). Although the DPEN1 202A, DPEN2 202B, and the data resource community 110 can have different IP addresses, each provider edge proxy application residing in a provider edge (e.g., the PE proxy applications 214A, 214B, and 214C residing in the data resource community 110, the DPEN1 202A, and the DPEN2 202B, respectively) can have the same address, referred to as a proxy application address (e.g., the PE proxy application address 314 discussed below). By this, the PE proxy application in each provider edge (e.g., the PE proxy applications 214A, 214B, and 214C residing in the data resource community 110, the DPEN1 202A, and the DPEN2 202B, respectively) can be reached by the same, known proxy application address. It must be understood that the examples provided are for illustration purposes only, and therefore should not be construed as limiting in any way.

In some embodiments, the path attributes category 302 can include a field named MP_REACH_NLRI 306 due to the BGP update message 404 being a MP-BGP message. In some embodiments, an address family identifier (AFI) 308, and a subsequent address family identifier (SAFI) 310, can be included in the BGP update message 404. In some embodiments, the AFI 308 and the SAFI 310 are associated with the MP_REACH_NLRI field 306. Conventionally, an AFI carries the identity of an IPv4 or an IPv6 Network Layer protocol associated with a network address that follows. For example, conventional AFI information indicates a value of "1" for IPv4 or a value of "2" for IPv6. Aspects of the present disclosure provide an AFI, such as the AFI 308, that has a value indicating a domain name system, such as the value "16." By this, the BGP update message 404 can convey application connectivity information about resources in the data resource community 110 through the network layer so as to bind the application layer and the network layer. The subsequent address family identifier, such as the SAFI 310, can provide additional information about the type of information carried in the message. For example, the SAFI 310 can have a value that indicates a Network Layer Reachability Information (NLRI) with an MPLS label, such as the value "4." The BGP update message 404 can include a field designated for NLRI following the SAFI 310, specifically the field designated for NLRI can correspond with or otherwise include application connectivity information. For example, the BGP update message 404 can include network layer reachability information 312. The network layer reachability information 312 can include application connectivity information 313. The application connectivity information 313 can include a PE proxy application address 314 that identifies a network address corresponding to the PE proxy application. For instance, the PE proxy application address 314 can match the PE proxy application address 214W currently assigned to the PE proxy application 214B when the BGP update message 404 is sent to the BGP server 212B associated with the PE B 210. In some embodiments, each PE proxy application (e.g., the PE proxy application 214A, the PE proxy application 214B, and the PE proxy application 214C) in each PE can have the same PE proxy application address, such as "20.20.20.1."

The network layer reachability information 312 and application connectivity information 313 can include one or more DNS resource record, such as a DNS service record 316 and a DNS text record 326. The DNS service record 316 can include a PE internet protocol (IP) address 318 associated with the data resource community 110, such as an IP address of the PE A 210A. The DNS service record 316 also can include a PE port number 320 for use in routing a proxy HTTP message across the private network 102 implementing MPLS. In some embodiments, the DNS service record 316 also can include a resource update indicator 324 that can include a portion of a URL corresponding to a resource in the data resource community 110 that has been updated and/or made available for use. The information from the DNS service record 316 can be used by a PE proxy application (e.g., the PE proxy application 214B) to generate a proxy HTTP request (e.g., the proxy HTTP request 440 shown in FIG. 3D) and populate the proxy HTTP request with information about the DNS service record 316 contained in the BGP update message 404. The DNS text record 326 can include an MPLS label 328 that can be used to route the proxy HTTP request 440 across the private network 102 to the PE proxy application 214A of the PE A 210A at the edge of the data resource community 110.

In some embodiments, the IP address of the provider edge corresponding to an updated resource (e.g., the PE IP address 318 for the PE A 210A of the data resource community 110 which has a resource update) may be identified in the BGP update message 404, which in turn can be included in the proxy HTTP request 440. For example, the application connectivity information 313 can include the PE IP address 318, which can be the IP address of the data resource community 110 because a compute and/or application resource within the data resource community 110 has been updated. The PE IP address 318 can be used to facilitate traversal of the proxy HTTP request 440 across the private network 102 using MPLS in order to reach the data resource community. Thus, in an embodiment, the PE IP address 318 included in the BGP update message 404 can be the same as the originator ID 304 (reflecting the IP address of the data resource community 110), although this may not always be the case. In some embodiments, multiple sets of application connectivity information can be included in the BGP update message 404 (where each set of application connectivity information pertains to a separate resource update within one or more networks) so as to indicate application reachability information into other networks coupled to the private network 102. It must be understood that the examples provided are for illustration purposes only, and therefore should not be construed as limiting in any way.

As discussed above, the local credential authentication message 430 can include a data partner role assertion, such as the data partner role assertion 336 shown in FIG. 3B. The authentication response 434 that is sent from the STS 150 to the PE proxy application 214B can include the STS key 332 and the role token 334, as seen in FIG. 3C and discussed above with reference to FIG. 2. FIG. 3D illustrates an embodiment of the proxy HTTP request 440. The PE proxy application 214B can extract information from the BGP update message 404, the local credential authentication message 430 and the authentication response 434 for use in generating the proxy HTTP request 440. For example, the PE proxy application 214B can prepend the STS key 332 and the role token 334 as an HTTP header signature 330 of a header of the proxy HTTP request 440. The PE proxy application 214B also can extract at least some of the application connectivity information 313 that was included in the BGP update message 404 under NLRI 312 for inclusion in the proxy HTTP request 440. Specifically, the PE proxy application 214B can extract the DNS service record 316, the DNS text record 326, and/or any other information contained in the application connectivity information 313 sent in the BGP update message 404. For example, the PE proxy application 214B can extract the PE IP address 318 that is associated with the PE, such as the PE A 210A, of the data resource community 110 and include the PE IP address 318 in the proxy HTTP request 440. In some embodiments, the PE port number 320 (corresponding to a port for the PE A 210A of the data resource community 110) and/or the PE proxy application address 314 (corresponding to both of the PE proxy applications 214A and 214B) can be included in the proxy HTTP request 440, which can be in the form of a query. In some embodiments the proxy HTTP request 440 can include the MPLS label 328 that was included in the DNS text record 326 from the BGP update message 404. The proxy HTTP request 440 also can include the resource update indicator 324, which can be associated with a URL of the URI input request 224 and/or a URI of the resource from the data resource community 110. The proxy HTTP request 440 can include commands that conform to the HTTP language, such as "GET," "POST," "PUT," or the like. Thus, through the injection of DNS resource records within the BGP update message 404, the application connectivity information 313 can bind the network layer (L3) with the application layer (L7) in the private network 102 to allow for secure communications while maintaining a federated security domain.

Figure 4A:
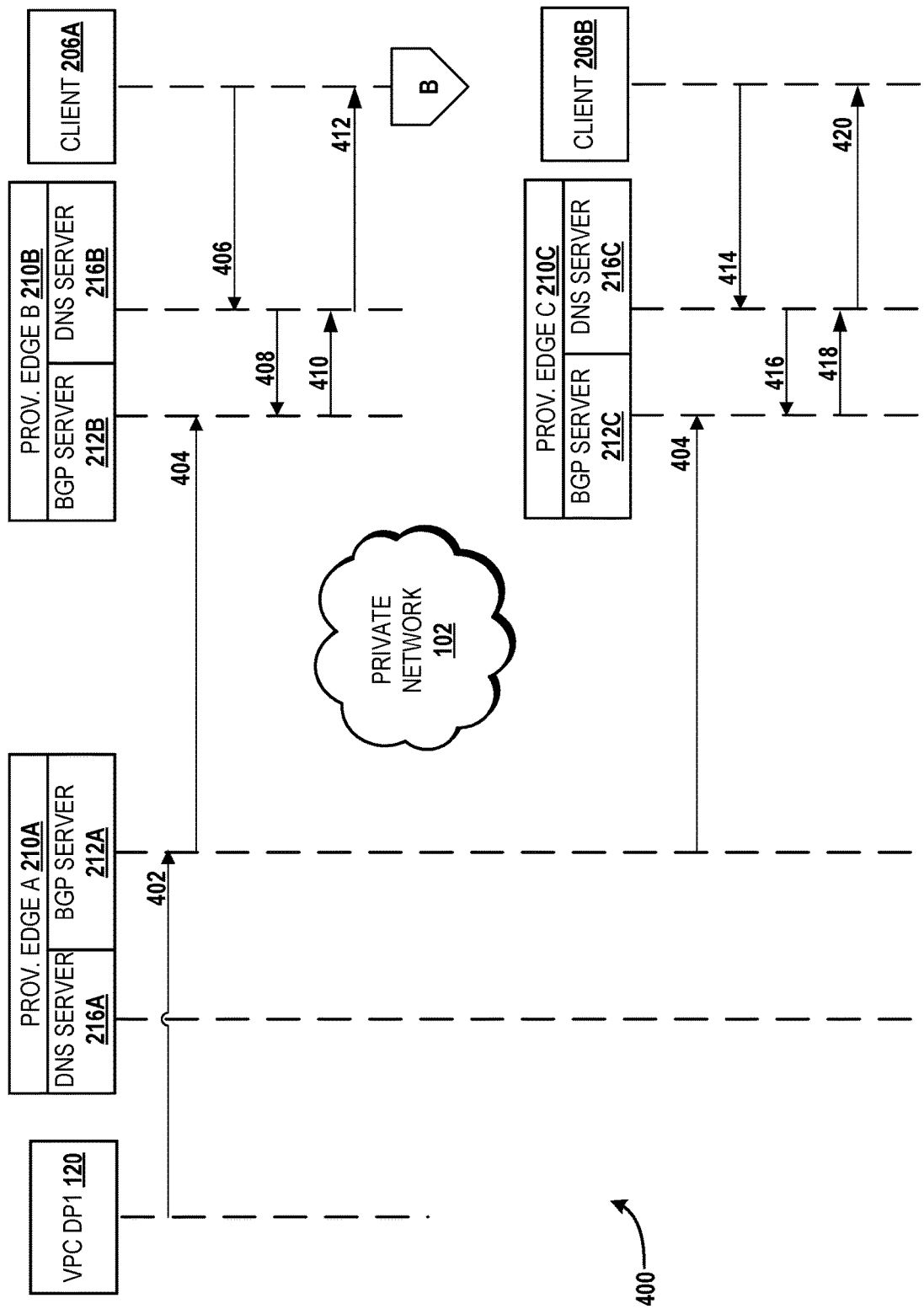
FIG. 4A illustrates an example sequence diagram for distributing application connectivity information via a border gateway protocol, according to an embodiment of the present disclosure.

Turning now to FIG. 4A with continued reference to FIGS. 1, 2, and 3A-3D, a diagram illustrating a message sequence 400 for distributing application connectivity information via a border gateway protocol is disclosed, according to an embodiment of the present disclosure. The message sequence 400 begins with the virtual private cloud data partner 1 (VPCDP1) 120 sending a DNS record update 402 to the BGP server 212A of the PE 210A at the data resource community 110. The DNS record update 402 can include a PE proxy application address that matches the IP address or network address, such as "20.20.20.1", used by all of the PE proxy applications, such as the PE proxy applications 214A, 214B, and 214C. The DNS record update 402 can be based on a compute and/or application resource that becomes available for use within the VPCDP1 120 of the data resource community 110. The BGP server 212A can generate a BGP update message, such as the BGP update message 404, in response to the DNS record update 402. The BGP update message 404 can be a MP-MGP update message. The BGP update message 404 can include an address family identifier (AFI) indicating a value for a domain name system, such as "16," and a subsequent address family identifier (SAFI) that indicates NLRI with a MPLS label. The NLRI indicated by the SAFI can include application connectivity information, such as the PE proxy application address 314 and other information included in application connectivity information 313 as discussed above with respect to FIG. 3A.

The BGP update message 404 can be sent to the BGP server of each PE connected to the private network 102, such as the BGP server 212B of the PE B 210B and the BGP server 212C of the PE C 210C. At some point in time after the BGP update message 404 is sent to the BGP server 212B and the BGP server 212C, a client in each of the data partner networks can send a DNS address query. For example, the client 206A sends a DNS address record query 406 to the DNS server 216B of the PE B 210B in the DPEN1 202A and a client 206B sends a DNS address record query 414 to the DNS server 216C of the PE C 210C in the DPEN2 202B. In response to receiving the DNS address query, the DNS server 216B can send a gRPC query 408 to the BGP server 212B. The BGP server 212B can determine that the gRPC query 408 pertains to the BGP update message 404 that contained the application connectivity information 313 from the data resource community 110. The BGP server 212B can send a gRPC response 410 to the DNS server 216B, where the gRPC response 410 instructs the DNS server 216B to redirect the client 206A to the PE proxy application 214B of the PE B 210B. The gRPC response 410 can include the PE proxy application address 314 that matches the PE proxy application address 214W and identifies the PE proxy application 214B. The DNS server 216B can provide, to the client 206A, a DNS address query answer 412 that includes the PE proxy application address 314 so as to redirect the client 206A to the PE proxy application 214B.

Similarly, the DNS server 216C of the PE C 210C can send a gRPC query 416 to the BGP server 212C in response to receiving the DNS address query 414 from the client 206B. The BGP server 212C can determine that the gRPC query 416 pertains to the BGP update message 404 that contained the application connectivity information 313 from the data resource community 110. The BGP server 212C can send a gRPC response 418 to the DNS server 216C, where the gRPC response 418 instructs the DNS server 216C to redirect the client 206B to the PE proxy application 214C of the PE C 210C. The gRPC response 418 can include the PE proxy application address 314 that identifies the PE proxy application 214C (which shares the same IP address as the PE proxy application 214B). The DNS server 216C can provide, to the client 206B, a DNS address query answer 420 that includes the PE proxy application address 314 so as to redirect the client 206B to the PE proxy application 214C. In some embodiments, the messaging sequence 400 can continue with a messaging sequence 401, such as illustrated in FIG. 4B.

Figure 4B:
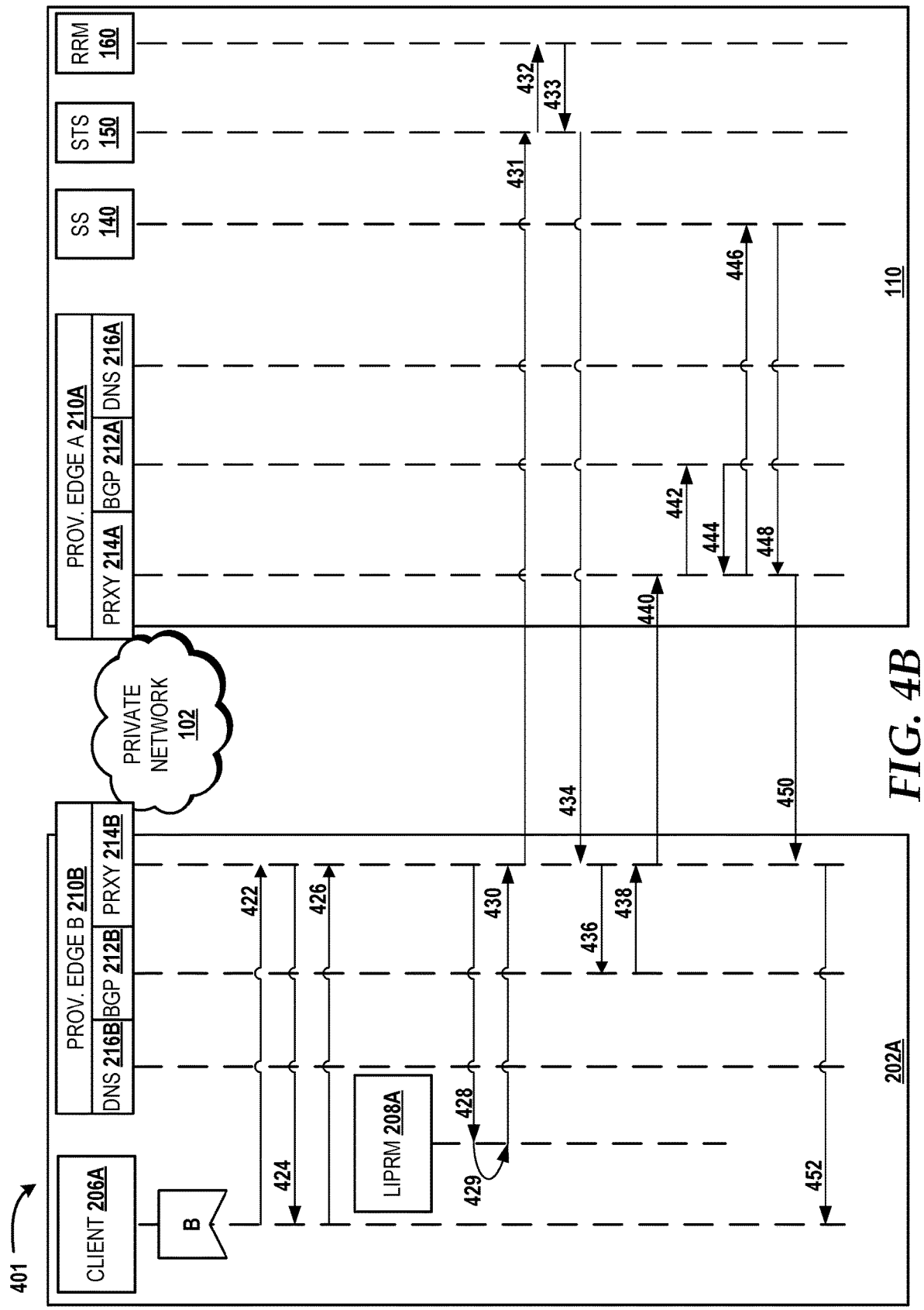
FIG. 4B illustrates an example sequence diagram for accessing a data resource community via a private network, according to an embodiment of the present disclosure.

Turning now to FIG. 4B with continued reference to FIGS. 1, 2, and 3A-3D, a diagram illustrating the messaging sequence 401 for accessing a data resource community via a private network is disclosed, according to an embodiment of the present disclosure. For illustration purposes only, the messaging sequence 401 is shown between the PE B 210B of the DPEN1 202A and the PE A 210A of the data resource community 110. However, it must be understood that a substantially similar messaging sequence can occur between other PE's of data partner enterprise networks connected to the private network 102, such as with the PE C 210C. As such, the example provided is for illustration purposes only and should not be construed as limiting in any way.

Having received the DNS address query answer 412 from the DNS server 216, the client 206A can send an HTTP request 422 to the PE proxy application 214B based on the PE proxy application address 314 provided in the BGP update message 404. For example, the client 206A can provide a "GET" command and a URL that was provided in the URI input request 224 and/or the resource update indicator 324 from the application connectivity information 313 in the BGP update message 404. The PE proxy application 214B may determine that the client 206A has not yet obtained authorization for accessing the data resource community 110. Thus, the PE proxy application 214B sends an authorization required response 424, such as a "401 authorization required" response, back to the client 206A. In turn, the client 206A replies to the PE proxy application 214B with a local authorization request 426, where the local authorization request 426 can include a "GET" command with an authorization header. The local authorization request 426 can include the local credentials 222 that were provided by the enterprise network user 236. In response to receiving the local authorization request 426, the PE proxy application 214B can send a data partner role request 428 to the LIPRM 208A. The data partner role request 428 can include at least a portion of the local credentials 222, such as an enterprise network user identifier and/or a user device identifier associated with the user device 225 corresponding to the enterprise network user 236. In some embodiments, the data partner role request 428 can include a "POST" command with the local credentials 222 attached and/or prepended to a header of the data partner role request 428. The LIPRM 208A can send a retrieve request 429 to an active directory of the LIPRM 208A in order to obtain the AD-LDAP role 234 that corresponds with the local credential 222 from the data partner role request 428. The LIPRM 208A can use the idP map 233 to determine a data partner role corresponding to the AD-LDAP role 234, and once determined, packages the data partner role assertion 336 for the PE proxy application 214B in a local credential authentication message, such as the local credential authentication message 430. The LIPRM 208A sends the local credential authentication message 430 to the PE proxy application 214B, where the local credential authentication message 430 includes the data partner role assertion 336.

The PE proxy application 214B prepares and sends an API call 431 to the STS 150, where the PE proxy application 214B assumes the data partner role asserted by the client 206A by providing the data partner role assertion 336 to the STS 150. As discussed above with respect to FIG. 2, in some embodiments the data partner role assertion 336 can be an SAML assertion. The STS 150 receives the API call 431 and sends a role token request 432 to the RRM 160, where the role token request 432 requests the RRM 160 to provide a role token, such as the role token 334, based on the data partner role assertion 336 provided. The RRM 160 can provide a role token response 433 to the STS 150, where the role token response 433 includes the role token 334, which was prepared based on the data partner role assertion 336. The STS 150 can determine that the PE proxy application 214B is authorized to access the private network 102 and the data resource community 110, and therefore sends the authentication response 434 to the PE proxy application 214B. The authentication response 434 can include the STS key 332 and the role token 334. In some embodiments, the STS key 332 can include a time-to-live value indicating the amount of allowed time the PE proxy application 214B may access the data resource community 110 before reauthorization is required. In some embodiments, the STS key 332 allows the client 206A to receive information and/or access resources within the data resource community 110 without the data resource community 110 knowing the identity associated with the enterprise network user 236. This is because the PE proxy application 214B can provide the STS key 332 and the role token 334 instead of providing the local credentials 222 or having to create a new account or subscription specifically for the enterprise network user 236. By this, the enterprise network user 236 can provide a single sign-on to the enterprise portal using the local credentials while federated security is maintained on the data resource community 110.

Once the PE proxy application 214B receives authentication response 434, the PE proxy application 214B can send a DNS record request 436 to the BGP server 212B, where the DNS record request 436 requests application connectivity information contained in the BGP update message 404, such as the information about the DNS service record 316 and/or the DNS text record 326 contained in the NLRI 312 of the BGP update message 404. In some embodiments, the DNS record request 436 and the DNS record reply 438 can be implemented using gRPC via the RPC interfaces (e.g., the RPC interface 215 and the RPC interface 213). The DNS record reply 438 can include the PE port number 320 and the PE IP address 318 corresponding to the PE A 210A of the data resource community 110, which both were extracted from the DNS service record 316 within the application connectivity information 313 and the field for NLRI 312 within the BGP update message 404. The PE proxy application 214B can prepare the proxy HTTP request 440 that includes the HTTP header signature 330 and application connectivity information 313. The HTTP header signature 330 can include the STS key 332 and the role token 334 that are prepended to an HTTP header of the proxy HTTP request 440. The proxy HTTP request 440 can be addressed such that the PE A 210A is the destination, such as by using the PE IP address 318 included in the DNS service record 316 in the BGP update message 404 (where the PE IP address 318 corresponds with the IP address of the PE A 210 for the data resource community 110 when connected to the private network 102) which, in turn was extracted from the DNS service record 316 and included in the DNS record reply 438. The proxy HTTP request 440 also can be MPLS labeled using the MPLS label 328 provided in the DNS text record 326 of the BGP update message 404 (which also was provided in the DNS record reply 438). The proxy HTTP request 440 can include a command, such as "GET" followed by the resource update indicator 324 and/or the URI input request 224, to request connection to a resource of the data resource community 110. For example, the resource update indicator 324 and/or the URI input request 224 can include a URL such as "foo (dot) violet (dot) service provider (dot) com," and thus the proxy HTTP request 440 can include a command "GET https (semicolon) foo (dot) violet (dot) service provider (dot) com," or another locator string. It must be understood that the examples provided are for illustration purposes only, and therefore should not be construed as limiting in any way. The PE proxy application 214A can receive the proxy HTTP request 440 and in response, confirm that the proxy HTTP request 440 contains information indicating that the PE B 210B is allowed to access the data resource community 110. For example, in some embodiments, the PE proxy application 214A can verify with the STS 150 that the STS key 332 is valid and verify with the RRM 160 that the role token 334 is approved for use.

The PE proxy application 214A can send a DNS record request 442 to the BGP server 212A, where the DNS record request 442 includes a request for a data resource community URI associated with the resource of the data resource community 110 which was mentioned in the proxy HTTP request 440. For example, the DNS record request 442 can include the URI input request 224 and/or the resource update indicator 324 so as to indicate which resource of the data resource community 110 the DNS record request 442 pertains. The BGP server 212A can provide a DNS record response 444 to the PE proxy application 214A that includes the data resource community URI, such as a URL of the SS 140 that is reachable through the VPCDP1 120. The PE proxy application 214A can send an access request 446 to the SS 140, which in some embodiments may occur through the VPG 128. The access request 446 can include the data resource community URI provided in the DNS record response 444 and the HTTP header signature 330 from the proxy HTTP request 440. By this, the access request 446 can include the STS key 332 and the role token 334 so that the SS 140 can determine the level of access and use that should be granted for the access request 446. The SS 140 can determine that the STS key 332 and the role token 334 are acceptable and can set access permissions according to the configuration assigned to the role token 334. The SS 140 can send an approval message 448 to the PE proxy application 214A, where the approval message 448 can confirm that the PE proxy application 214B of the PE B 210B is authorized to connect and use specific resources within the SS 140 according to the role token 334 provided. The PE proxy application 214A can provide a forward message 450 to the PE proxy application 214B so as to relay the approval message 448 to the PE B 210B. The PE proxy application 214B can receive the forward message 450, and provide an access approval message 452 to the client 206A. In some embodiments, the approval message 448, the forward message 450, and the access approval message 452 can include substantially similar information, such as an HTTP status success response of "200 OK." In some embodiments, the approval message 448, the forward message 450, and the access approval message 452 can each include a payload from the SS 140, where the payload provides data and/or information from the compute resource and/or application made available to the client 206A by the SS 140. Once access for the client 206A has been approved, the client 206A may freely connect with the data resource community 110, such as accessing resources from the SS 140. It is understood that a sequence of operations that are substantially similar to the messaging sequence 401 can be undertaken between the client 206B of the DPEN2 202B so as to also access the SS 140 for collaboration and sharing of resources.

Figure 5A:
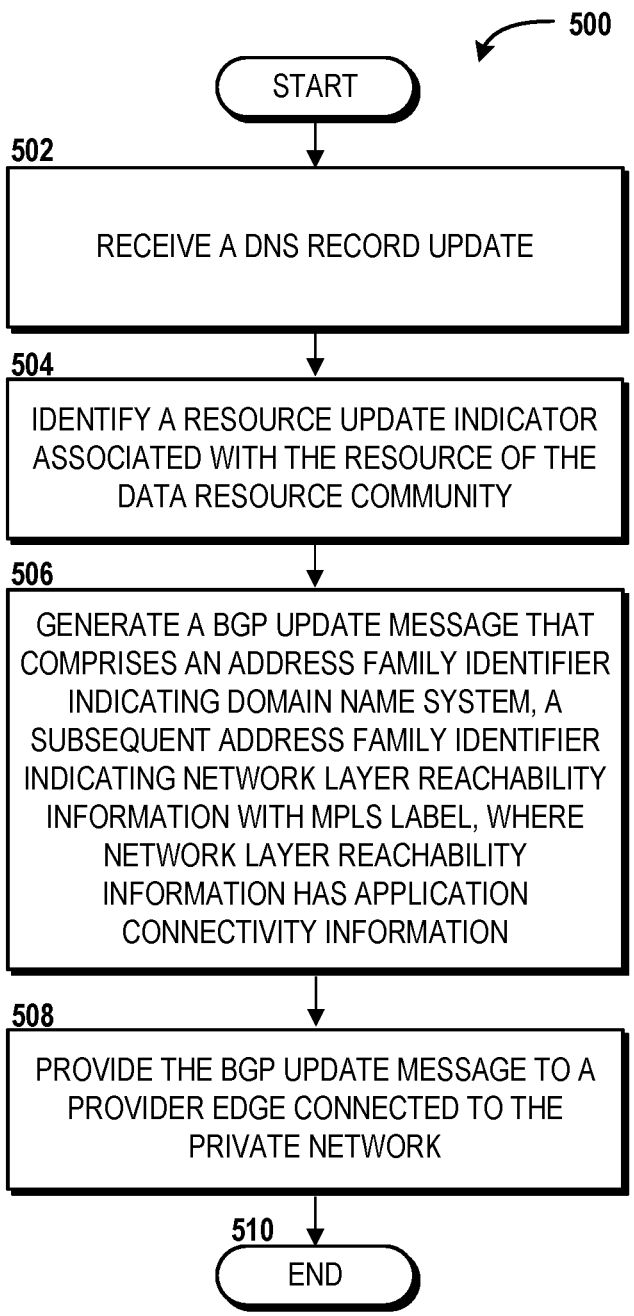
FIG. 5A is a flow diagram illustrating a method for distributing application connectivity information via a border gateway protocol, according to an embodiment of the present disclosure.
Figure 5B:
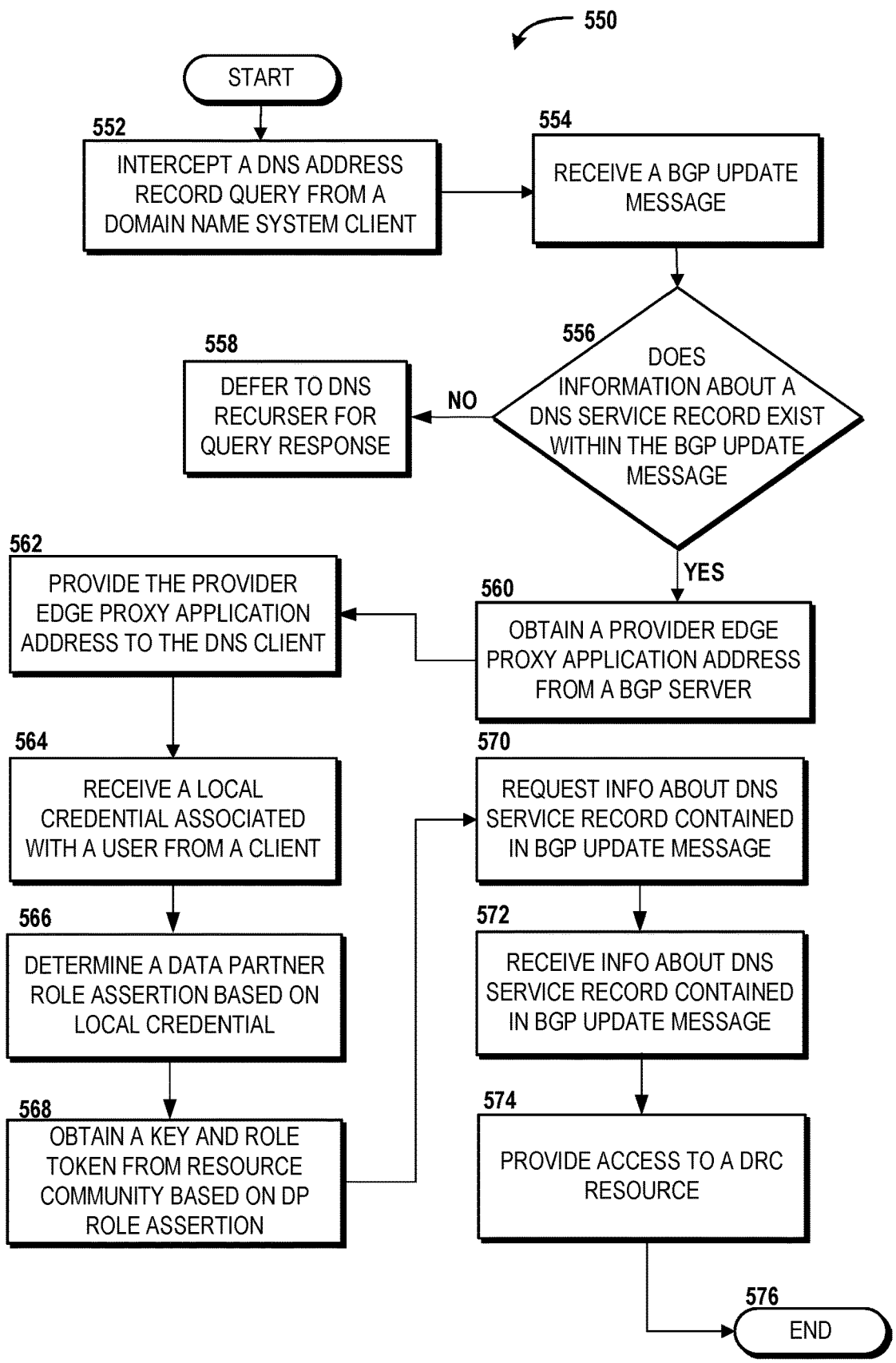
FIG. 5B is a flow diagram illustrating a method for accessing a data resource community via a private network, according to an embodiment of the present disclosure.

Turning now to FIGS. 5A and 5B, aspects of a method 500 for distributing application connectivity information via a border gateway protocol and a method 550 for accessing a data resource community via a private network, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of a computing system or device discussed herein, such as a PE, to perform one or more operations and/or causing the processor to direct other components of a computing system or device to perform one or more of the operations.

For purposes of illustrating and describing some of the concepts of the present disclosure, operations of the method 500 are described as being performed, at least in part, by a computer system of a PE (e.g., one or more of PE A 210A, PE B 210B, or PE C 210C) via execution, by one or more processors, of one or more software modules, such as for example, the PE application 211B that configures one or more processors. It should be understood that additional and/or alternative devices and/or network devices can provide the functionality described herein via execution of one or more modules, applications, and/or other software. Thus, the illustrated embodiments are illustrative, and should not be viewed as being limiting in any way.

The method 500 will be described with reference to FIGS. 1, 2, 3A, 4A, and 5A. The method 500 begins and proceeds to operation 502, where the BGP server 212A, which is executing at the PE A 210A of the data resource community 110, can receive a DNS record update, such as the DNS record update 402. The DNS record update 402 can indicate that a compute resource and/or application (e.g., one or more of the collection of SaaS 126A-N) is available for use by one or more data partner enterprise networks, such as DPEN1 202A and DPEN2 202B. It should be understood that these examples are illustrative and therefore should not be construed as being limiting in any way.

From operation 502, the method 500 proceeds to operation 504, where the BGP server 212A can identify a resource update indicator, such as the resource update indicator 324, associated with the resource of the data resource community 110. For example, the BGP server 212A can determine that the DNS record update 402 pertains to the SS 140 that is connected to the VPCDP1 120, and thus obtain the resource update indicator 324 for inclusion within a BGP update message. From operation 504, the method 500 can proceed to operation 506, where the BGP server 212A can generate a BGP update message, such as the BGP update message 404 discussed above. The BGP update message 404 can be implemented to announce the availability of the compute and/or application resource(s) within the data resource community 110 through use of the network layer of the private network 102. In some embodiments, the BGP server 212A can generate the BGP update message 404 so as to include an address family identifier (AFI) and a subsequent address family identifier (SAFI), such as the AFI 308 and the SAFI 310. The AFI 308 provides a value, such as the value "16", indicating that the BGP update message 404 pertains to domain name system information. The SAFI 310 can indicate network layer reachability information along with a MPLS label. The BGP update message 404 can have a field for the NLRI, such as the NLRI 312 that contains the application connectivity information 313. The BGP server 212A can generate the BGP update message 404 such that application connectivity information is included in the field for the NLRI 312, such as the application connectivity information 313 contained in the NLRI 312. It is understood that in some embodiments, the BGP update message 404 can conform to an extension of BGP, such MP-BGP.

From operation 506, the method 500 can proceed to operation 508 where the BGP server 212A can provide the BGP update message 404 to a PE connected to the private network 102, such as any of the PE B 210B and/or the PE C 210C. Specifically, the BGP update message 404 can be provided to a BGP server that resides within each PE connected to the private network 102, such as the BGP server 212B of the PE B 210B and/or the BGP server 212C of the PE C 210C. The BGP update message 404 can be provided along a network layer (L7) of the private network 102. It is understood that the BGP update message 404 can be considered an internal BGP (iBGP) communication because the private network 102 can be configured as an autonomous system. In an alternate embodiment, the BGP update message 404 provided by the BGP server 212A may be an external BGP (eBGP) communication. It should be understood that these examples are illustrative and therefore should not be construed as being limiting in any way. From operation 508, the method proceeds to operation 510, where the method 500 ends.

Turning now to FIG. 5B, the method 550 is provided according to an embodiment of the present disclosure. The method 550 begins and proceeds to operation 552, where a DNS server at a PE that communicatively couples with a private network, such as the DNS server 216B of the PE B 210 communicatively coupled to the private network 102, can intercept a DNS address record query from a DNS client, such as the DNS address record query 406 from the client 206A. As discussed above with respect to FIG. 1, the private network 102 can include a layer three virtual private network that uses multi-protocol label switching. From operation 552, the method 550 can proceed to operation 554 where the BGP server at the PE, such as the BGP server 212B at the PE B 210B, can receive a BGP update message, such as the BGP update message 404, from the PEA 210A.

From operation 554, the method 550 can proceed to operation 556, where the DNS server 216B at the PE B 210B can determine whether information about a DNS service record exists within the BGP update message 404 that was received by the BGP server 212B of the PE B 210B. For example, the DNS server 216B can determine whether the BGP update message 404, that the BGP server 212B received, contains application connectivity information such as the DNS service record 316 and/or the DNS text record 326. If the BGP update message 404 being analyzed does not contain information about a DNS service record, the method 550 proceeds to operation 558, where the DNS server 216B can defer to a local DNS recursor, such as the local DNS recursor 203A, in order to resolve the DNS address query from the client 206A. For example, the local DNS recursor 203A can resolve the DNS address query using stored cache and/or by requesting information from a DNS authoritative name server slave using a public network. If the BGP update message 404 being analyzed does contain information about a DNS service record (or in some embodiments any other application connectivity information 313), then the method 550 can proceed to operation 560. At operation 560, the DNS server 216B can obtain a PE proxy application address contained in the BGP update message 404 from the BGP server, such as the PE proxy application address 314 of the BGP update message 404 from the BGP server 212B. The BGP update message 404 can include a PE proxy application address, an address family identifier (AFI), and a subsequent address family identifier (SAFI) (such as seen in FIG. 3A). The address family identifier (AFI) can indicate a domain name system (e.g., the value "16" instead of a value corresponding to IPv4 and/or IPv6). The subsequent address family identifier (SAFI) can indicate network layer reachability information (NLRI), such as the NLRI 312. The NLRI 312 can include application connectivity information 313, which has the DNS service record 316, the DNS text record 326, and the PE proxy application address 314. From operation 560, the method 550 can proceed to operation 562.

At operation 562, the DNS server 216B can provide the PE proxy application address 314 to the client 206A, in a response to the DNS address record query, such as the DNS address record query 406. Providing the PE proxy application address to the client 206A can direct the client 206A to use a Hypertext Transfer Protocol (e.g., via the HTTP client module 207) in order to connect to the PE proxy application 214B. From operation 562, the method 550 proceeds to operation 564, where the PE proxy application 214B can receive a local credential (e.g., the local credentials 222 that are associated with the enterprise network user 236) from the client 206A. From operation 564, the method 550 proceeds to operation 566, where the PE proxy application 214B can determine a data partner role assertion based on the local credentials 222. For example, the PE proxy application 214B can provide the local credentials to the LIPRM 208A, which in turn can use the idP map 233 to identify the data partner role assertion 336 and provide the data partner role assertion 336 to the PE proxy application 214B. From operation 566, the method 550 proceeds to operation 568, where the PE proxy application 214B executing at the PE B 202A, can obtain a key (e.g., the STS key 332) and a role token (e.g., the role token 334) based on the data partner role assertion 336. For example, the PE proxy application 214B can make an API call to the STS 150 and provide the data partner role assertion 336, and in return, can receive the STS key 332 and the role token 334.

From operation 568, the method 550 proceeds to operation 570, where the PE proxy application 214B can request, from the BGP server 212B, the application connectivity information 313, such as information about the DNS service record 316 and/or the DNS text record 326 contained in the BGP update message 404. From operation 570, the method 550 proceeds to operation 572, where the PE proxy application 214B can receive the application connectivity information 313, such as the information about the DNS service record 316 and/or the DNS text record 326 contained in the BGP update message 404. From operation 572, the method 550 can proceed to operation 574, where the PE proxy application 214B can provide access (for the enterprise network user 236 via the client 206A) to the data resource community 110 via the private network 102. In some instances, providing access to the data resource community 110 can be based on the key (e.g., the STS key 332), the role token (e.g., the role token 334), and the information about the DNS service record contained in the BGP update message 404 (e.g., the DNS service record 316 and/or the DNS text record 326 that are included in the application connectivity information 313). From operation 574, the method 550 proceeds to operation 576, where the method 550 ends.

Figure 6:
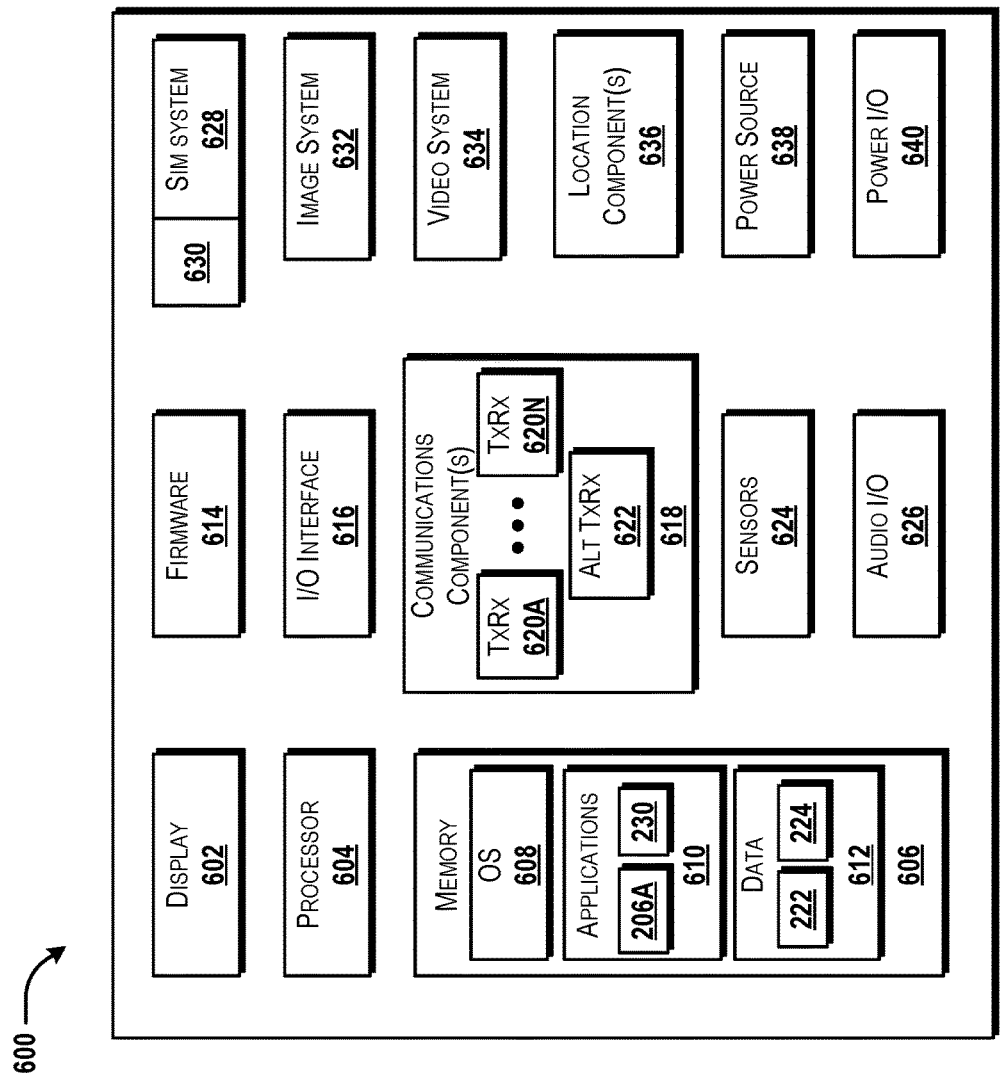
FIG. 6 is a block diagram illustrating an example mobile device capable of implementing aspects of embodiments presented herein.

Turning now to FIG. 6, an illustrative mobile device 600 and components thereof will be described. In some embodiments, one or more of the user devices 225 (shown in FIG. 2) can be configured like the mobile device 600. In some embodiments, one or more of the clients 206A, 206B (shown in FIG. 1) can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UI") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting local credentials (e.g., user IDs and passwords) for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, one or more identifiers, and/or other applications or program modules. In some embodiments, the data 612 can include the local credentials 222, the URI input request 224, the idP map 233, the local DNS recursor 203A, and/or other data that is being sent to and/or from the data resource community 110. According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 610 can include the client 206A and/or the enterprise portal 230. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
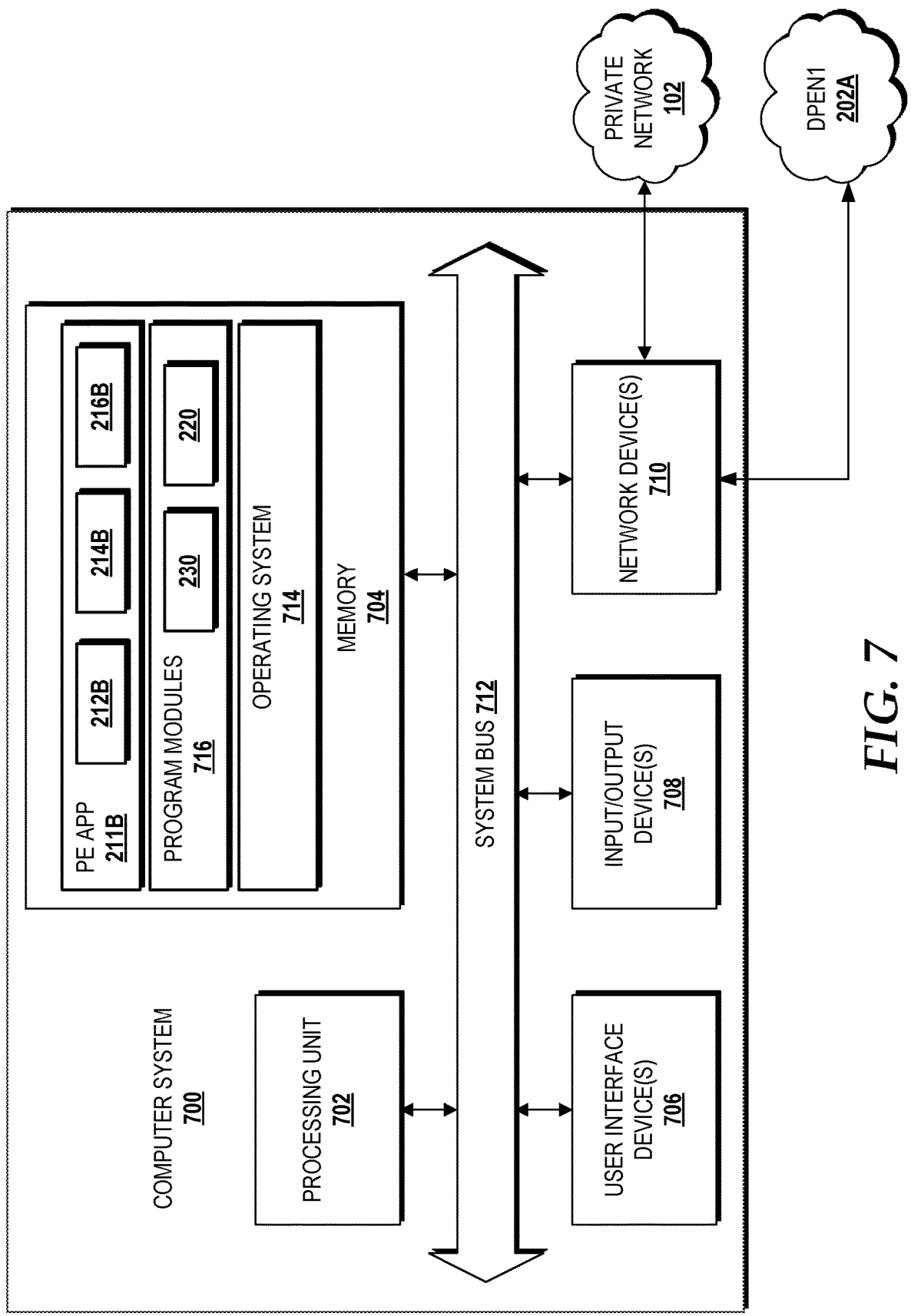
FIG. 7 is a block diagram illustrating an example computer system capable of implementing aspects of the embodiments disclosed herein.

Turning now to FIG. 7 is a block diagram illustrating a computer system 700 configured to provide the functionality in accordance with various embodiments of the concepts and technologies disclosed herein. The systems, devices, and other components disclosed herein can utilize, at least in part, an architecture that is the same as or at least similar to the architecture of the computer system 700. In some embodiments, one or more of the PEs (e.g., any of the PE A 210A, PE B 210B, and PE C 210C) and/or the computer system 204A can be configured like the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. In some embodiments, for example, the program modules 716 include the enterprise portal 230, the traffic utility tool 220, and/or other program modules. Additionally, in some embodiments, the BGP servers (e.g., the BGP server 212A, 212B, 212C), the DNS servers (e.g., the DNS server 216A, 216B, 216C), and the PE proxy applications (e.g., the PE proxy application 214A, 214B, 214C) can be included in the program modules 716 and/or as modules within a PE application (e.g., the PE application 211B). These and/or other programs can be embodied in computer-readable media containing instructions that, when executed by the processing unit 702, perform one or more of the methods 500, 550 described in detail above with respect to FIGS. 5A-5B. According to some embodiments, the program modules 716 may be embodied in hardware, software, firmware, or any combination thereof. Although not shown in FIG. 7, it should be understood that the memory 704 also can be configured to store the local credentials 222, the LIPRM 208A, the client 206A, the local DNS recursor 203A, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network, such as the private network(s) 102, and/or data partner enterprise networks (e.g., the DPEN1 202A and/or the DPEN2 202B). Examples of the network devices 710 include, but are not limited to, a modem, a radio frequency ("RF") or infrared ("IR") transceiver, a telephonic interface, a bridge, a router, or a network card. The network 102 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 102 may be or may include a wired network such as, but not limited to, a Wide Area Network ("WAN"), a wired Personal Area Network ("PAN"), or a wired Metropolitan Area Network ("MAN").

Figure 8:
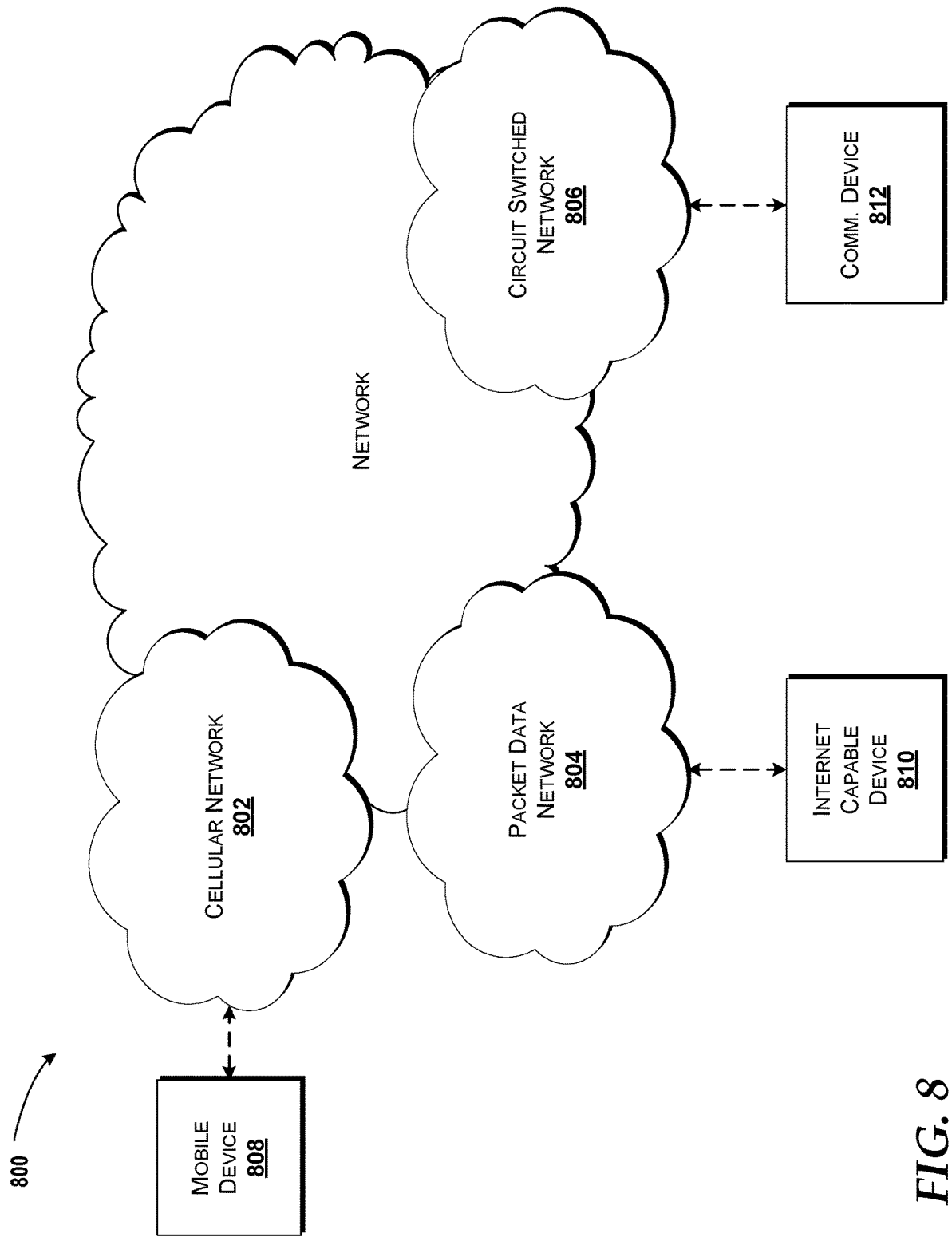
FIG. 8 is a block diagram illustrating an example network capable of implementing aspects of the embodiments presented herein.

Turning now to FIG. 8, details of a network 800 are illustrated, according to an illustrative embodiment. In some embodiments, the network 800 includes a data partner enterprise network(s), such as the data partner enterprise network(s) 202A, 202B, through 202N. The network 800 includes a cellular network 802, a packet data network 804, for example, the Internet, and a circuit switched network 806, for example, a PSTN. The cellular network 802 includes various components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the user device(s) 225, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. In some embodiments, a data partner enterprise network (e.g., the DPEN1 202A) and/or the private network 102 can be configured as a packet data network, such as the packet data network 804. The circuit switched network 806 includes various hardware and software for providing circuit switched communications. The circuit switched network 806 may include, or may be, what is often referred to as a POTS. The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network is used to refer broadly to any combination of the networks 802, 804, 806 shown in FIG. 8 and/or the DPEN1 202A and the DPEN2 202B shown in FIG. 1. It should be appreciated that substantially all of the functionality described with reference to the network(s) 202A, 202B, 202N can be performed by the cellular network 802, the packet data network 804, and/or the circuit switched network 806, alone or in combination with other networks, network elements, and the like.

Figure 9:
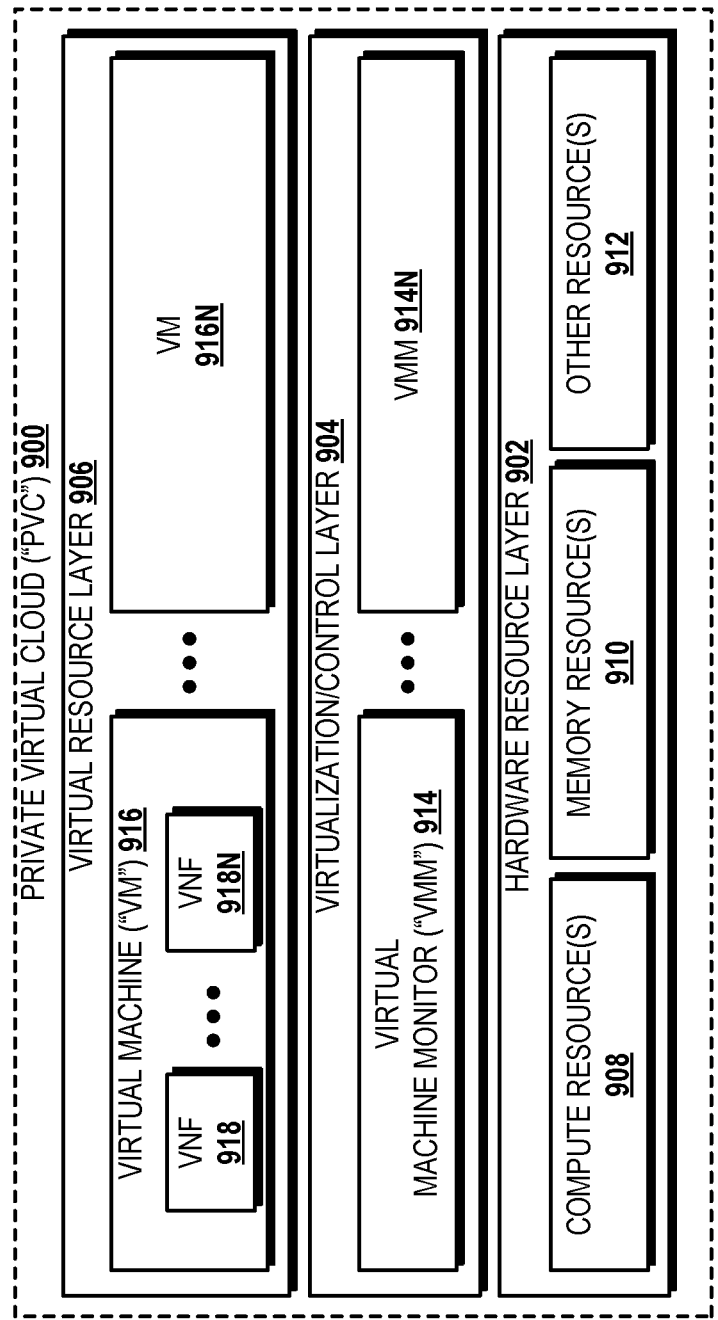
FIG. 9 is a block diagram illustrating aspects of a data resource community capable of supporting a virtual private cloud for implementing the embodiments presented herein.

Turning now to FIG. 9, a private virtual cloud ("PVC") 900 will be described, according to an exemplary embodiment. The architecture of the PVC 900 can be used to implement digital resources, such as compute resources and applications of the data resource community 110 disclosed herein. For example, the PVC 900 can be utilized to implement the data resource community 110, the PVCDP1 120, the PVCDP2 130, other PVCs, or some combination thereof.

The PVC 900 is a shared infrastructure that can support multiple services and network applications. The illustrated PVC 900 includes a hardware resource layer 902, a virtualization/control layer 904, and a virtual resource layer 906 that work together to perform operations as will be described in detail herein.

The hardware resource layer 902 provides hardware resources, which, in the illustrated embodiment, include one or more compute resources 908, one or more memory resources 910, and one or more other resources 912. The compute resource(s) 908 can include one or more hardware components that perform computations to process data, and/or to execute computer-executable instructions of one or more application programs, operating systems, and/or other software. The compute resources 908 can include one or more central processing units ("CPUs") configured with one or more processing cores. The compute resources 908 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 908 can include one or more discrete GPUs. In some other embodiments, the compute resources 908 can include CPU and GPU components that are configured in accordance with a co-processing CPU/GPU computing model, wherein the sequential part of an application executes on the CPU and the computationally-intensive part is accelerated by the GPU. The compute resources 908 can include one or more system-on-chip ("SoC") components along with one or more other components, including, for example, one or more of the memory resources 910, and/or one or more of the other resources 912. In some embodiments, the compute resources 908 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 908 can be or can include one or more hardware components architected in accordance with an ARM architecture, available for license from ARM HOLDINGS of Cambridge, United Kingdom. Alternatively, the compute resources 908 can be or can include one or more hardware components architected in accordance with an x86 architecture, such an architecture available from INTEL CORPORATION of Mountain View, Calif., and others. Those skilled in the art will appreciate the implementation of the compute resources 908 can utilize various computation architectures, and as such, the compute resources 908 should not be construed as being limited to any particular computation architecture or combination of computation architectures, including those explicitly disclosed herein.

The memory resource(s) 910 can include one or more hardware components that perform storage operations, including temporary or permanent storage operations. In some embodiments, the memory resource(s) 910 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 908.

The other resource(s) 912 can include any other hardware resources that can be utilized by the compute resources(s) 908 and/or the memory resource(s) 910 to perform operations described herein. The other resource(s) 912 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 902 can be virtualized by one or more virtual machine monitors ("VMMs") 914-914N (also known as "hypervisors"; hereinafter "VMMs 914") operating within the virtualization/control layer 904 to manage one or more virtual resources that reside in the virtual resource layer 906. The VMMs 914 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916-916N (hereinafter "VMs 916"). Each of the VMs 916 can execute one or more applications.

Based on the foregoing, it should be appreciated that concepts and technologies directed to virtual private network based distribution for compute resource and application accessibility have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   intercepting, by a domain name system server of a provider edge of an enterprise network that communicatively couples with a private network, a domain name system address record query from a domain name system client;
   receiving, by a border gateway protocol server of the provider edge of the enterprise network, from a provider edge of a data resource community, a border gateway protocol update message, wherein the border gateway protocol update message indicates an availability of at least one of a compute resource or an application resource within the data resource community;
   determining, by the border gateway protocol server of the provider edge of the enterprise network, whether the domain name system address record query pertains to the border gateway protocol update message;
   in response to the border gateway protocol server determining that the domain name system address record query pertains to the border gateway protocol update message, receiving, by the domain name system server, from the border gateway protocol server, a provider edge proxy application address of a provider edge proxy application executing at the provider edge of the enterprise network;
   providing, by the domain name system server, the provider edge proxy application address to the domain name system client in a response to the domain name system address record query so as to redirect the domain name system client to the provider edge proxy application in order to connect a user associated with the domain name system address record query to the data resource community;
   receiving, by the provider edge proxy application, from the border gateway protocol server, connectivity information contained in the border gateway protocol update message; and
   providing, by the provider edge proxy application, access to the data resource community via the private network based on the connectivity information contained in the border gateway protocol update message, a key, and a role token.

2. The method of claim 1, wherein the private network comprises a layer three virtual private network that uses multi-protocol label switching.

3. The method of claim 1, wherein the border gateway protocol update message comprises the provider edge proxy application address.

4. The method of claim 1, further comprising:
   receiving, by the provider edge proxy application, from the domain name system client, a local credential associated with the user;
   determining a data partner role assertion based on the local credential associated with the user;
   obtaining, by the provider edge proxy application, from the data resource community, the key and the role token based on the data partner role assertion, wherein at least the key allows the domain name system client to access resources within the data resource community without the data resource community knowing an identity associated with the user;
   requesting, by the provider edge proxy application, from the border gateway protocol server, the connectivity information contained in the border gateway protocol update message; and
   sending, by the provider edge proxy application using at least a portion of the connectivity information, a request comprising the key and the role token to the provider edge of the data resource community to request connection to the data resource community.

5. The method of claim 1, wherein the border gateway protocol update message comprises an address family identifier and a subsequent address family identifier, the address family identifier indicating a domain name system, and the subsequent address family identifier indicating network layer reachability information.

6. A provider edge of an enterprise network comprising:
   a processor; and
   a memory storing program modules comprising a domain name system server, a border gateway protocol server, and a provider edge proxy application, wherein the program modules are embodied in computer-executable instructions that, in response to being executed by the processor, cause the processor to perform operations comprising:
      intercepting, by the domain name system server, a domain name system address record query from a domain name system client,
      receiving, by the border gateway protocol server, from a provider edge of a data resource community, a border gateway protocol update message via a private network, wherein the border gateway protocol update message indicates an availability of at least one of a compute resource or an application resource within the data resource community,
      determining, by the border gateway protocol server, whether the domain name system address record query pertains to the border gateway protocol update message,
      in response to the border gateway protocol server determining that the domain name system address record query pertains to the border gateway protocol update message, receiving, by the domain name system server, from the border gateway protocol server, a provider edge proxy application address of the provider edge proxy application,
      providing, by the domain name system server, the provider edge proxy application address to the domain name system client in a response to the domain name system address record query so as to redirect the domain name system client to the provider edge proxy application in order to connect a user associated with the domain name system address record query to the data resource community, receiving, from the border gateway protocol server, connectivity information contained in the border gateway protocol update message, and providing, via the provider edge proxy application, access to the data resource community via the private network based on the connectivity information contained in the border gateway protocol update message, a key, and a role token.

7. The provider edge of the enterprise network of claim 6, wherein the private network comprises a layer three virtual private network that uses multi-protocol label switching.

8. The provider edge of the enterprise network of claim 6, wherein the border gateway protocol update message comprises the provider edge proxy application address.

9. The provider edge of the enterprise network of claim 6, wherein the operations further comprise:

receiving, by the provider edge proxy application, from the domain name system client, a local credential associated with the user;

determining a data partner role assertion based on the local credential associated with the user;

obtaining, via the provider edge proxy application, from the data resource community, the key and the role token based on the data partner role assertion, wherein at least the key allows the domain name system client to access resources within the data resource community without the data resource community knowing an identity associated with the user;

requesting, via the provider edge proxy application, from the border gateway protocol server, the connectivity information contained in the border gateway protocol update message; and sending, by the provider edge proxy application using at least a portion of the connectivity information, a request comprising the key and the role token to the provider edge of the data resource community to request connection to the data resource community.

10. The provider edge of the enterprise network of claim 6, wherein the border gateway protocol update message comprises an address family identifier and a subsequent address family identifier, the address family identifier indicating a domain name system, and the subsequent address family identifier indicating network layer reachability information.

11. A computer storage medium having program modules comprising a domain name system server, a border gateway protocol server, and a provider edge proxy application stored thereon, the program modules embodied in computer-executable instructions that, in response to execution by a processor, cause the processor to perform operations comprising:

intercepting, by the domain name system server, a domain name system address record query from a domain name system client;

receiving, by the border gateway protocol server, from a provider edge of a data resource community, a border gateway protocol update message via a private network, wherein the border gateway protocol update message indicates an availability of at least one of a compute resource or an application resource within the data resource community;

determining, by the border gateway protocol server, whether the domain name system address record query pertains to the border gateway protocol update message;

in response to the border gateway protocol server determining that the domain name system address record query pertains to the border gateway protocol update message, receiving, by the domain name system server, from the border gateway protocol server, a provider edge proxy application address of the provider edge proxy application;

providing, by the domain name system server, the provider edge proxy application address to the domain name system client in a response to the domain name system address record query so as to redirect the domain name system client to the provider edge proxy application in order to connect a user associated with the domain name system address record query to the data resource community;

receiving, from the border gateway protocol server, connectivity information contained in the border gateway protocol update message; and providing, by the provider edge proxy application, access to the data resource community via the private network based on the connectivity information contained in the border gateway protocol update message, a key, and a role token.

12. The computer storage medium of claim 11, wherein the private network comprises a layer three virtual private network that uses multi-protocol label switching.

13. The computer storage medium of claim 11, wherein the border gateway protocol update message comprises the provider edge proxy application address.

14. The computer storage medium of claim 11, wherein the operations further comprise:

receiving, by the provider edge proxy application, from the domain name system client, a local credential associated with the user;

determining a data partner role assertion based on the local credential associated with the user;

obtaining, via the provider edge proxy application, from the data resource community, the key and the role token based on the data partner role assertion, wherein at least the key allows the domain name system client to access resources within the data resource community without the data resource community knowing an identity associated with the user;

requesting, via the provider edge proxy application, from the border gateway protocol server, the connectivity information contained in the border gateway protocol update message; and sending, by the provider edge proxy application using at least a portion of the connectivity information, a request comprising the key and the role token to the provider edge of the data resource community to request connection to the data resource community.

15. The computer storage medium of claim 11, wherein the border gateway protocol update message comprises an address family identifier and a subsequent address family identifier, the address family identifier indicating a domain name system, and the subsequent address family identifier indicating network layer reachability information.

* * * * *